US012078117B2

(12) United States Patent
Jitsuishi et al.

(10) Patent No.: US 12,078,117 B2
(45) Date of Patent: Sep. 3, 2024

(54) CONTROL DEVICE FOR VARIABLE VALVE TIMING MECHANISM AND CONTROL METHOD THEREFOR

(71) Applicant: Hitachi Astemo, Ltd., Hitachinaka (JP)

(72) Inventors: Makoto Jitsuishi, Hitachinaka (JP); Nobuhiko Matsuo, Hitachinaka (JP)

(73) Assignee: Hitachi Astemo, Ltd, Hitachinaka (JP)

( * ) Notice: Subject to any disclaimer, the term of this patent is extended or adjusted under 35 U.S.C. 154(b) by 0 days.

(21) Appl. No.: 18/024,217

(22) PCT Filed: Sep. 9, 2021

(86) PCT No.: PCT/JP2021/033143
§ 371 (c)(1),
(2) Date: Mar. 1, 2023

(87) PCT Pub. No.: WO2022/075001
PCT Pub. Date: Apr. 14, 2022

(65) Prior Publication Data
US 2023/0332551 A1    Oct. 19, 2023

(30) Foreign Application Priority Data

Oct. 5, 2020 (JP) ................................ 2020-168422

(51) Int. Cl.
*F02D 13/02* (2006.01)
*F02D 41/00* (2006.01)

(52) U.S. Cl.
CPC ......... *F02D 41/0097* (2013.01); *F02D 13/02* (2013.01); *F02D 13/0219* (2013.01);
(Continued)

(58) Field of Classification Search
CPC ............. F02D 13/0219; F02D 13/0238; F02D 41/0097; F02D 2041/0092; F02D 2200/101
(Continued)

(56) References Cited

U.S. PATENT DOCUMENTS

| 7,069,140 B2 * | 6/2006 | Sheikh ................. F02D 41/009 701/111 |
| 8,931,332 B2 * | 1/2015 | Suzuki ................... F02P 17/12 73/114.27 |

(Continued)

FOREIGN PATENT DOCUMENTS

| JP | 2006-112385 A | 4/2006 |
| JP | 2013-185481 A | 9/2013 |

(Continued)

OTHER PUBLICATIONS

International Search Report (PCT/ISA/210) issued in PCT Application No. PCT/JP2021/033143 dated Nov. 22, 2021 with English translation (five (5) pages).
(Continued)

*Primary Examiner* — Erick R Solis
(74) *Attorney, Agent, or Firm* — Crowell & Moring LLP

(57) ABSTRACT

A control device for an electric variable valve timing mechanism is provided that can reduce the influence of rotation variations of an engine on a VTC detection angle computation. The control device for a variable valve timing mechanism uses a crank sensor signal and a cam sensor signal of the engine to calculate a rotation phase of the VTC mechanism. A pulse interval of the crank sensor signal is used for a calculation of the rotation phase of the VTC mechanism, and a calculation method of the rotation phase of VTC mechanism is changed depending on the pulse interval of the crank sensor signal determined before the cam sensor signal is input.

10 Claims, 34 Drawing Sheets

(52) U.S. Cl.
CPC ............... *F02D 2041/0092* (2013.01); *F02D 2200/0414* (2013.01); *F02D 2200/101* (2013.01)

(58) Field of Classification Search
USPC ........... 73/114.03, 114.27; 123/90.15, 90.16, 123/406.61–406.63; 701/102
See application file for complete search history.

(56) References Cited

U.S. PATENT DOCUMENTS

| | | | | |
|---|---|---|---|---|
| 2002/0112683 | A1* | 8/2002 | Kunz | F02D 41/062 123/90.15 |
| 2003/0000498 | A1* | 1/2003 | Mathews | F02D 41/062 123/406.62 |
| 2006/0081203 | A1* | 4/2006 | Izumi | F02D 13/0219 123/348 |
| 2009/0276145 | A1* | 11/2009 | Schafer | F02D 41/009 318/625 |
| 2015/0167503 | A1 | 6/2015 | Stone | |

FOREIGN PATENT DOCUMENTS

| | | |
|---|---|---|
| JP | 2014-101861 A | 6/2014 |
| JP | 2015-524539 A | 8/2015 |

OTHER PUBLICATIONS

Japanese-language Written Opinion (PCT/ISA/237) issued in PCT Application No. PCT/JP2021/033143 dated Nov. 22, 2021 (three (3) pages).

International Preliminary Report on Patentability (PCT/IB/338 & PCT/IB/373) issued in PCT Application No. PCT/JP2021/033143 dated Apr. 20, 2023, including Japanese-language Written Opinion (PCT/ISA/237), with English translation (10 pages).

\* cited by examiner

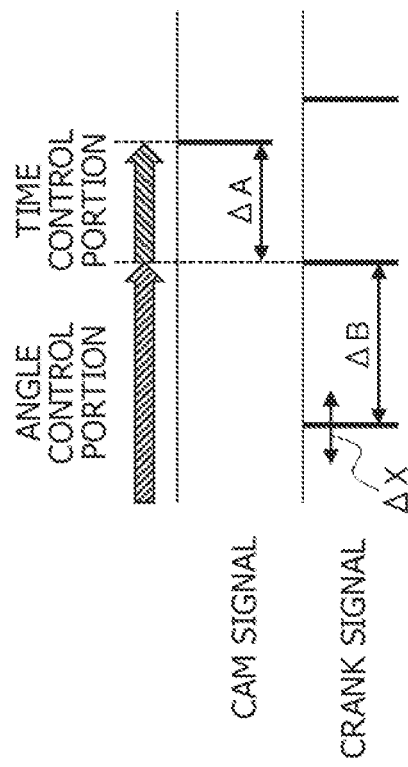

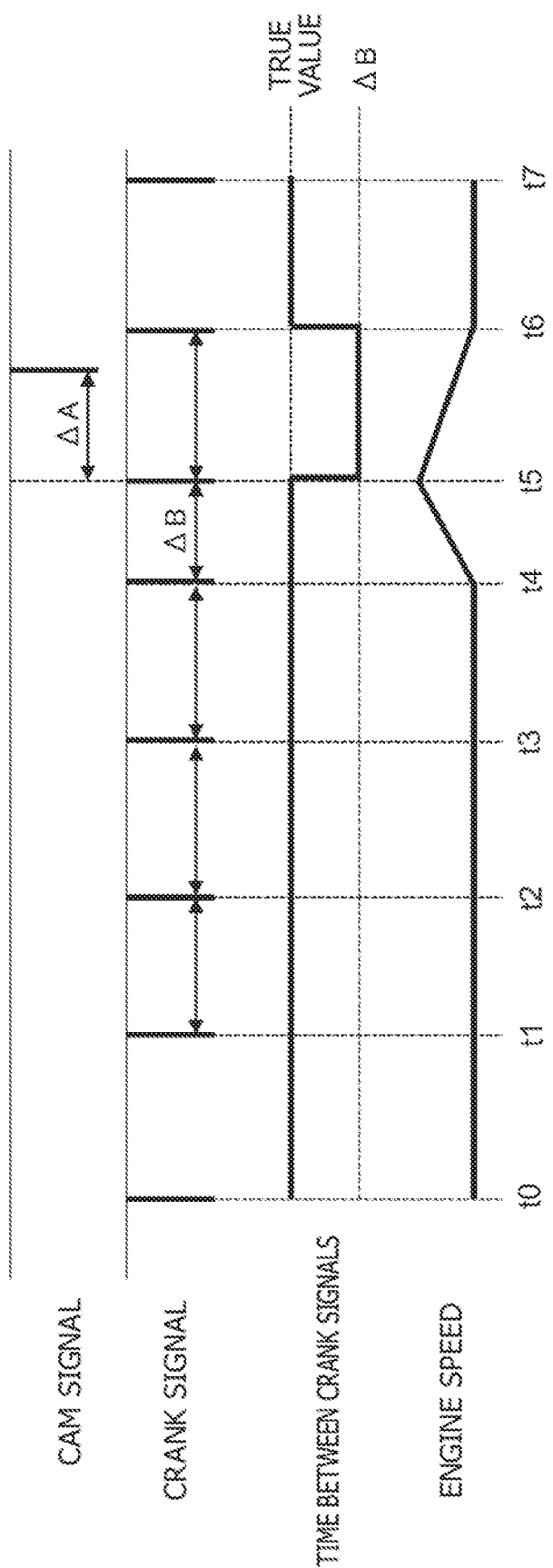

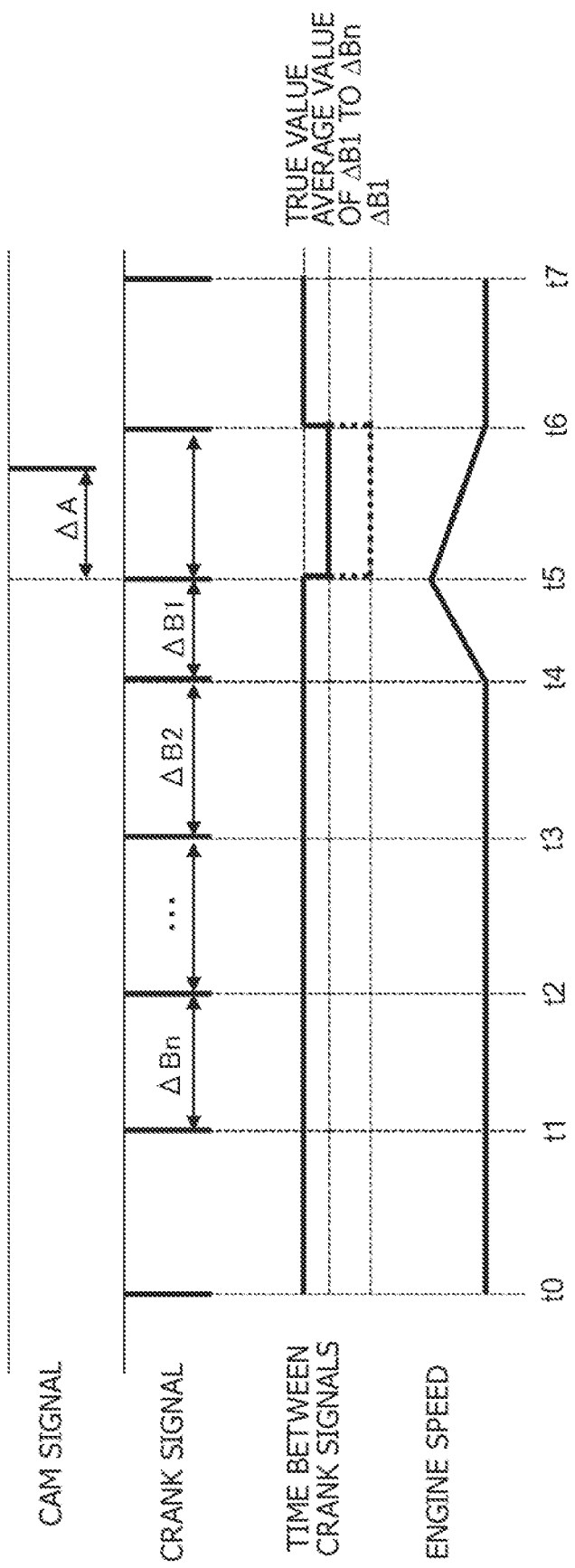

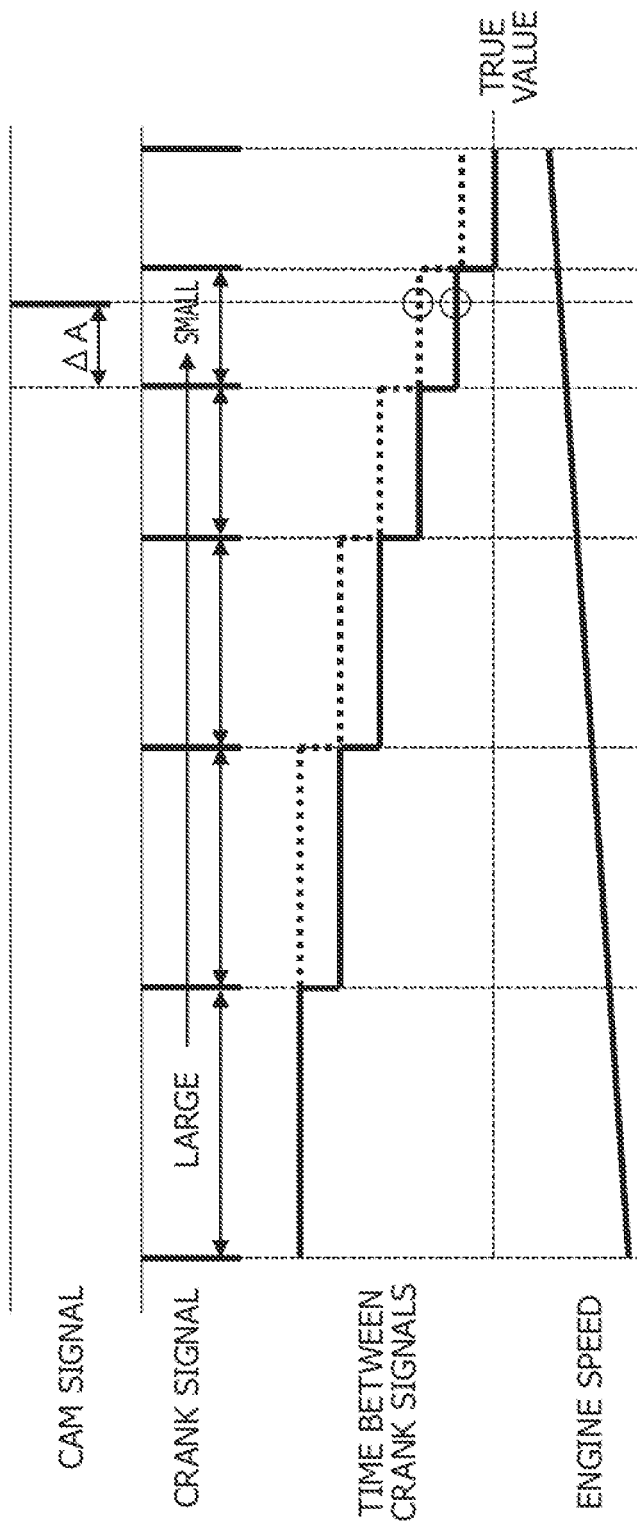

FIG.12A

[NORMAL POSITION] ENGINE SPEED [r/min] (THEORETICAL VALUE)

| ENGINE SPEED | TIME CONTROL PORTION ANGLE | | |
|---|---|---|---|
| [r/min] | 7.5deg.CA | 9deg.CA | 10.5deg.CA |
| 100 | 83.33 | 100.00 | 116.67 |
| 200 | 166.67 | 200.00 | 233.33 |
| 300 | 250.00 | 300.00 | 350.00 |
| 500 | 416.67 | 500.00 | 583.33 |
| 1000 | 833.33 | 1000.00 | 1166.67 |

FIG.12B

[NON-TOOTHED] ENGINE SPEED [r/min] (THEORETICAL VALUE)

| ENGINE SPEED | TIME CONTROL PORTION ANGLE | | |
|---|---|---|---|
| [r/min] | 27.5deg.CA | 29deg.CA | 30.5deg.CA |
| 100 | 94.83 | 100.00 | 105.17 |
| 200 | 189.66 | 200.00 | 210.34 |
| 300 | 284.48 | 300.00 | 315.52 |
| 500 | 474.14 | 500.00 | 525.86 |
| 1000 | 948.28 | 1000.00 | 1051.72 |

FIG.12C (REFERENCE) ENGINE SPEED [r/min] (THEORETICAL VALUE)

| ENGINE SPEED | TIME CONTROL PORTION ANGLE | |
|---|---|---|
| [r/min] | 1deg.CA | 2.5deg.CA |
| 100 | 100.00 | 250.00 |
| 200 | 200.00 | 500.00 |
| 300 | 300.00 | 750.00 |
| 500 | 500.00 | 1250.00 |
| 1000 | 1000.00 | 2500.00 |

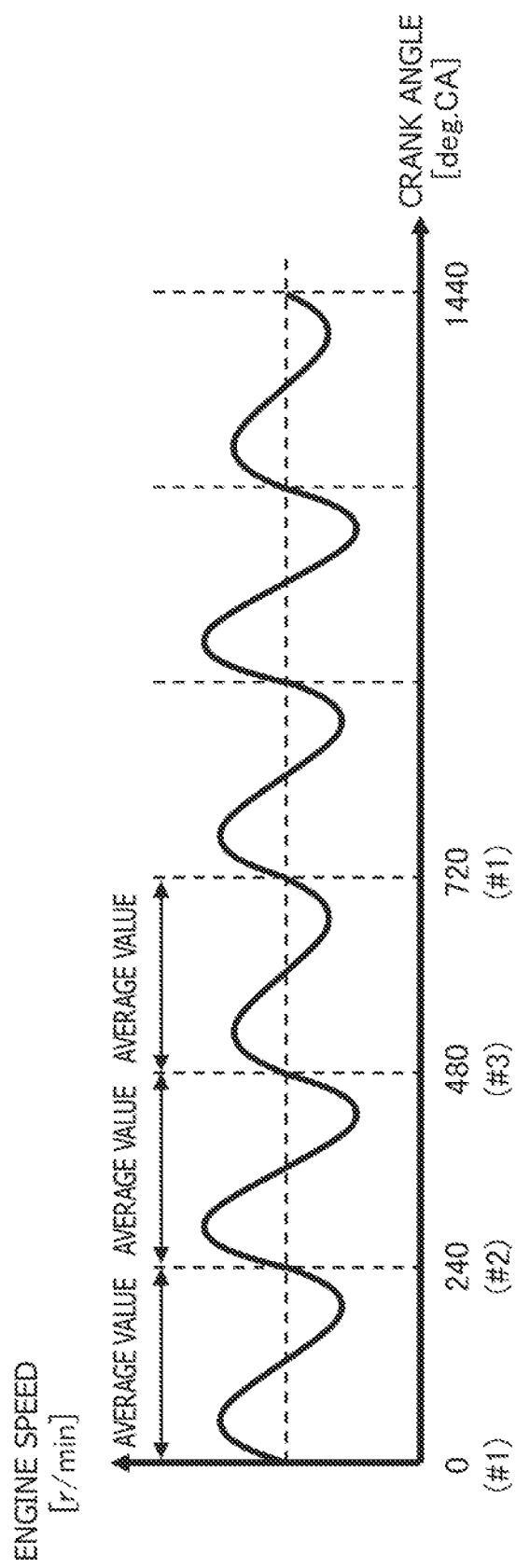

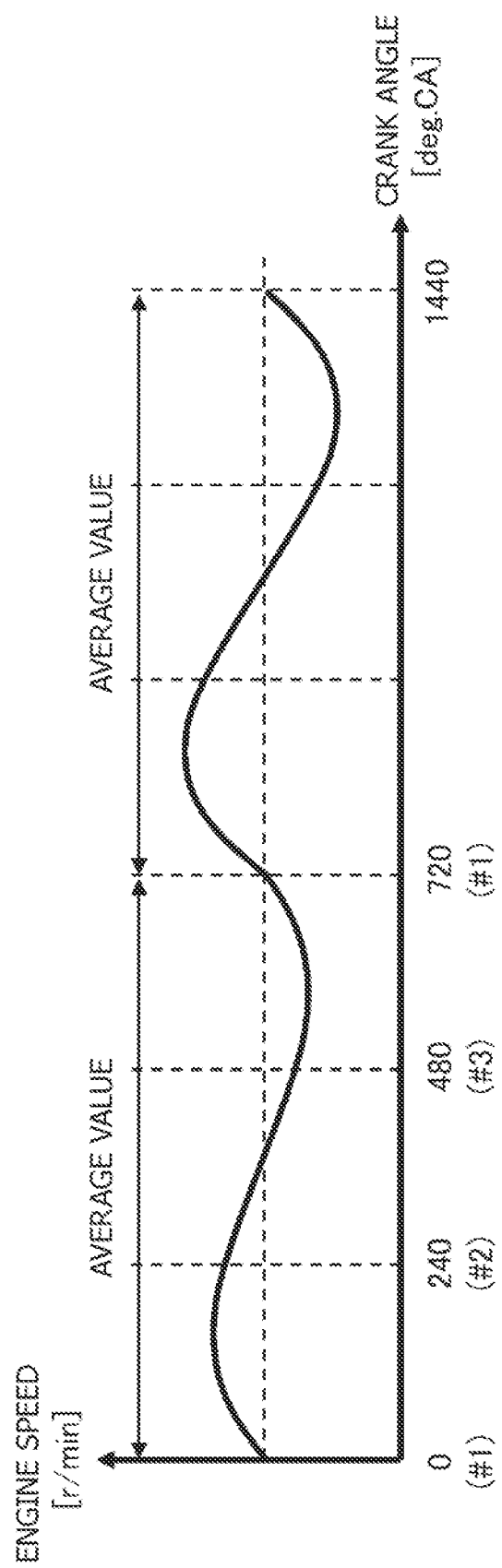

CONTROL DEVICE FOR VARIABLE VALVE TIMING MECHANISM AND CONTROL METHOD THEREFOR

TECHNICAL FIELD

The present invention relates to a control device for a variable valve timing control (VTC) mechanism and to a control method therefor, the control device using a crank sensor signal and cam sensor signal of an engine to calculate a rotation phase of the variable valve timing mechanism.

BACKGROUND ART

Patent Document 1 discloses a phase control device and phase control method for a variable valve timing device, which limits an advance angle amount and a delay angle amount of a cam shaft phase angle, in a low-rotation region where rotation variations of an engine become large. In Patent Document 1, in the case in which a calculated cam shaft phase angle appears at an advance angle side when at an intake valve side, or appears at a delay angle side when at an exhaust valve side, depending on the engine speed, a filter is applied to the calculated cam shaft phase angle to delay an update or to limit an update.

REFERENCE DOCUMENT LIST

Patent Document

Patent Document 1: JP 2014-101861 A

SUMMARY OF THE INVENTION

Problem to be Solved by the Invention

In recent years, Hybrid Electric Vehicles (HEVs) and Plug-in Hybrid Electric Vehicle (PHEVs) have become widespread. In these vehicles, since the engine repeatedly stops and restarts, the operation of a VTC mechanism occurs more in the starting setting. A hydraulic VTC mechanism such as in Patent Document 1 has hydraulic pressure of the engine as a driving source, and the operating range and response speed are affected by the engine speed and the oil temperature. Accordingly, electric VTC mechanisms, which can operate even with an engine speed lower than that of hydraulic VTC mechanisms and with a low oil temperature, are increasing.

However, even in electric VTC mechanisms, there is the possibility of an erroneous computation of a VTC detection angle (cam detection angle) occurring, at the time of starting the engine or at the time of extremely low rotation speed. In particular, in a state in which the VTC mechanism is held at a constant angle, an erroneous computation continuously occurs when there are large variations in rotation the engine, and a deflection of the VTC detection angle occurs. If this computation result is used to perform feedback control, a deflection will also occur in an operation amount of the VTC mechanism. As a result of this, the motor drive current increases, the power consumption increases, and this results in a deterioration of fuel efficiency. Furthermore, heat is generated by an increase in the motor drive current, and this leads to decrease in durability of the electric VTC mechanism and actuator.

An object of the present invention, which has been made in consideration of such circumstances, is to provide a control device and control method for an electric variable valve timing mechanism that can reduce the influence of rotation variations of an engine on a VTC detection angle computation.

Means for Solving the Problem

A control device for a variable valve timing mechanism relating to an embodiment of the present invention uses a crank sensor signal and a cam sensor signal of an engine to calculate a rotation phase of the variable valve timing mechanism and to control the variable valve timing mechanism, the control device uses a pulse interval (time) of the crank sensor signal for a calculation of the rotation phase of the variable valve timing mechanism, and changes a calculation method of the rotation phase of the variable valve timing mechanism depending on the pulse interval (time) of the crank sensor signal determined before the cam sensor signal is input.

Furthermore, a control method for a variable valve timing mechanism relating to another embodiment of the present invention uses a crank sensor signal and a cam sensor signal of an engine to calculate a rotation phase of the variable valve timing mechanism and to control the variable valve timing mechanism, the control method including the steps of calculating the rotation phase of the variable valve timing mechanism by using a pulse interval (time) of the crank sensor signal, and changing a calculation method of the rotation phase of the variable valve timing mechanism depending on the pulse interval (time) of the crank sensor signal determined before the cam sensor signal is input.

Effects of the Invention

According to the present invention, the influence of rotation variations of an engine on a VTC detection angle computation can be reduced, by using information of a pulse interval of a past crank sensor signal, and changing a calculation method of a rotation phase of a variable valve timing mechanism.

BRIEF DESCRIPTION OF THE DRAWINGS

FIG. 7A is a timing chart for describing a conventional calculation method of a VTC detection angle (CAM detection angle).

FIG. 7B is a timing chart for describing a conventional calculation method of a VTC detection angle (CAM detection angle).

FIG. 8B is a timing chart for discussing a calculation method of a VTC detection angle (CAM detection angle).

FIG. 9B is a timing chart for discussing a change of a calculation method of a VTC detection angle.

FIG. 12A is a diagram for discussing a permitted rotation variation width in accordance with the engine speed.

FIG. 12B is a diagram for discussing a permitted rotation variation width in accordance with the engine speed.

FIG. 12C is a diagram for discussing a permitted rotation variation width in accordance with the engine speed.

FIG. 27A is a waveform diagram for describing a correspondence to rotation variations of an engine.

FIG. 27B is a waveform diagram for describing a correspondence to rotation variations of an engine.

MODE FOR CARRYING OUT THE INVENTION

Hereinbelow, embodiments of the present invention will be described with reference to the accompanying drawings.

Figure 1:
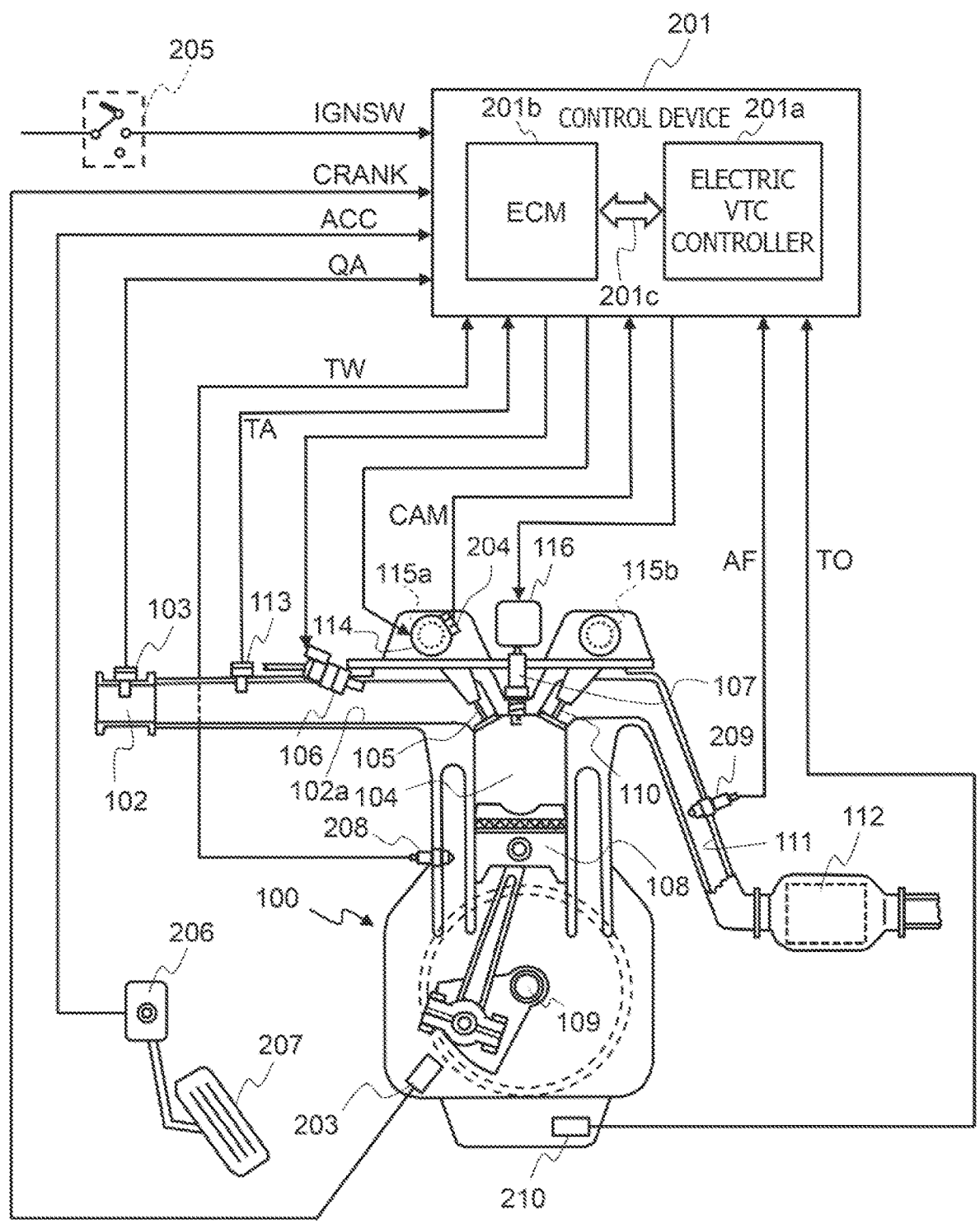
FIG. 1 is a system configuration diagram of an engine applying a control device for a variable valve timing mechanism relating to an embodiment of the present invention.

FIG. 1 is a system configuration diagram of an engine applying a control device for a variable valve timing mechanism relating to an embodiment of the present invention.

An engine (internal combustion engine) 100 is mounted on a vehicle and is used as a power source. Engine 100, other than the illustrated series type, can be of various types such as a V-type or a horizontally opposed type.

An intake air amount sensor 103 for detecting an intake airflow amount QA of engine 100 is provided in an intake duct 102 of engine 100, and an intake temperature sensor 113 for measuring a temperature TA of air taken in by engine 100 is provided in an intake port 102a.

An intake valve 105 opens and closes an intake port of a combustion chamber 104 of each cylinder. A fuel injection valve 106 is arranged for each cylinder in intake port 102a on an upstream side of intake valve 105. Here, while an example is given in which fuel injection valve 106 injects fuel into intake duct 102, it may be a cylinder direct injection type internal combustion engine that injects fuel directly into combustion chamber 104.

Fuel injected from fuel injection valve 106 is taken in together with air into combustion chamber 104 via intake valve 105 and ignited and burned by spark ignition by an ignition plug 107, and pressure by this combustion presses down a piston 108 toward a crankshaft 109, thereby rotatably driving crankshaft 109.

Furthermore, an exhaust valve 110 opens and closes an exhaust port of combustion chamber 104, and by opening exhaust valve 110, exhaust gas inside combustion chamber 104 is exhausted to an exhaust pipe 111.

A catalytic converter 112, which includes a three-way catalyst or the like, is installed in exhaust pipe 111, and exhaust gas is purified by catalytic converter 112.

Intake valve 105 is operated to open in accordance with rotation of an intake camshaft 115a, which is rotatably driven by crankshaft 109. Furthermore, exhaust valve 110 is operated to open in accordance with rotation of an exhaust camshaft 115b, which is rotatably driven by crankshaft 109.

A VTC mechanism 114 is an electric VTC mechanism that changes a relative rotation phase angle of intake camshaft 115a with respect to crankshaft 109, by an electric motor (DC motor with a brush) as an actuator, thereby continuously changing a phase of a valve operating angle of intake valve 105, that is, a valve timing of intake valve 105, in an advance angle direction and in a delay angle direction.

Furthermore, an ignition module 116 for supplying ignition energy to ignition plug 107 is directly attached to each ignition plug 107 provided in each cylinder. Ignition module 116 includes an ignition coil and a power transistor for controlling energization to the ignition coil.

A control device (electronic control unit) 201 includes an electric VTC controller 201a for driving and controlling VTC mechanism 114, and an engine control module (hereinafter, called an ECM) 201b for controlling fuel injection valve 106, ignition module 116 or the like. Electric VTC controller 201a and ECM 201b each include a microcomputer that contains a CPU, RAM, ROM or the like, and computes and outputs an operation amount of various types of devices by performing computation processes in accordance with programs stored beforehand in a memory such as the ROM. Furthermore, electric VTC controller 201a includes a drive circuit such as an inverter for driving the electric motor of VTC mechanism 114.

Electric VTC controller 201a and ECM 201b are configured to perform data transfer between each other via a Controller Area Network (CAN) 201a.

Note that, other than electric VTC controller 201a and ECM 201b, an AT controller or the like for controlling an automatic transmission combined with the internal combustion engine, for example, is connected to CAN 201c as a communication circuit network.

In addition to receiving intake airflow amount QA output from intake air amount sensor 103 as an input, control device 201 receives, as an input, output signals from a crank angle sensor 203 outputting a rotation angle signal (called a crank sensor signal) CRANK of crankshaft 109, an acceleration opening sensor 206 for detecting a depressed amount of an accelerator pedal 207, in other words, an accelerator opening ACC, a cam angle sensor 204 for outputting a rotation angle signal (called a cam sensor signal) CAM of intake camshaft 115a, a water temperature sensor 208 for detecting a temperature TW of cooling water of engine 100, an air-fuel ratio sensor 209, which is installed in exhaust pipe 111 on an upstream side of catalytic converter 112, for detecting an air-fuel ratio AF based on an oxygen concentration during exhaust, an oil temperature sensor 210 for detecting an oil temperature TO of engine oil inside an oil pan (or a circulation path of engine oil), intake temperature sensor 113 for measuring temperature TA of air taken in by engine 100 and the like, and also receives, as an input, a signal IGNSW from an ignition switch (engine switch) 205, which is a main switch for starting and stopping engine 100.

Figure 2:
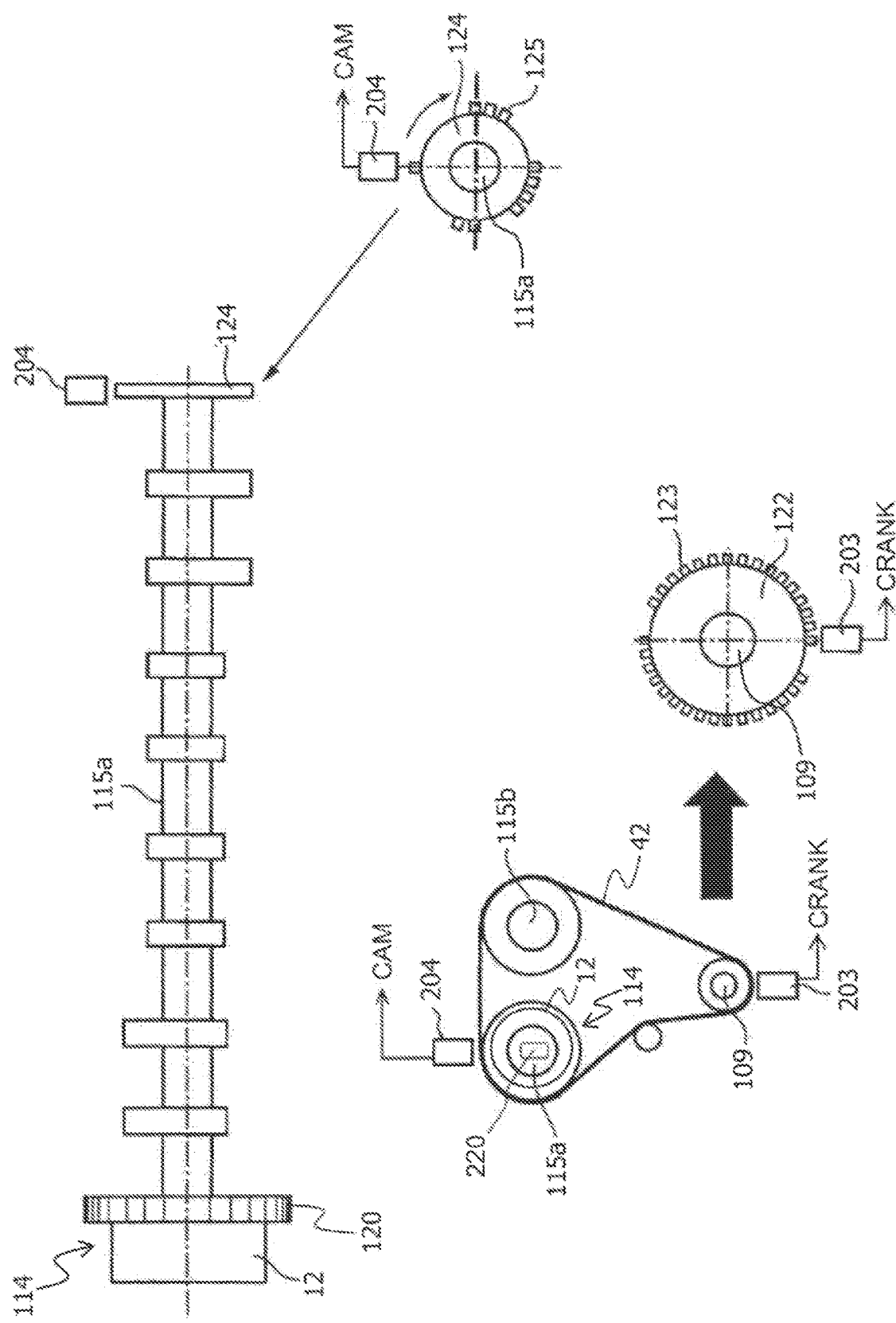
FIG. 2 is a schematic diagram for describing a setting example to the engine of the variable valve timing mechanism and various sensors shown in FIG. 1.

FIG. 2 is a schematic diagram for describing a setting example to engine 100 of VTC mechanism 114 and various sensors shown in FIG. 1. VTC mechanism 114 is provided on one end side of intake camshaft 115a of engine 100, which is an in-line 4-cylinder, 4-cycle engine in this example. Power from crankshaft 109 of engine 100 is transmitted to intake camshaft 115a for opening and closing intake valve 105 and to exhaust camshaft 115b for opening and closing exhaust valve 110, via a timing chain (or a timing belt) 42. Also, a sprocket part 120 of crankshaft 109 and VTC mechanism 114 rotates synchronously via timing chain 42.

Crank angle sensor 203 outputs crank sensor signal CRANK by detecting multiple projecting parts 123, provided as parts to be detected, on the surrounding of a signal plate 122 supported by crankshaft 109. Furthermore, cam angle sensor 204 is provided on the other end side of intake camshaft 115a, and outputs cam sensor signal CAM by detecting multiple projecting parts 125, provided as parts to be detected, on the surrounding of a signal plate 124 supported by the other end of intake camshaft 115a.

In addition, a motor rotation angle sensor 220 is provided on an electric motor 12 as an actuator of VTC mechanism 114, and a motor shaft rotation angle signal MAS is output every time a motor shaft, which is an output shaft of electric motor 12, rotates by a predetermined rotation angle.

Here, the positional relationship between crank sensor signal CRANK and cam sensor signal CAM is absolute, and when electric motor 12 (motor shaft part) is operated, intake camshaft 115a operates relative to sprocket part 120. On the other hand, the positional relationship between crank sensor signal CRANK and motor shaft rotation angle signal MAS is relative.

Figure 3:
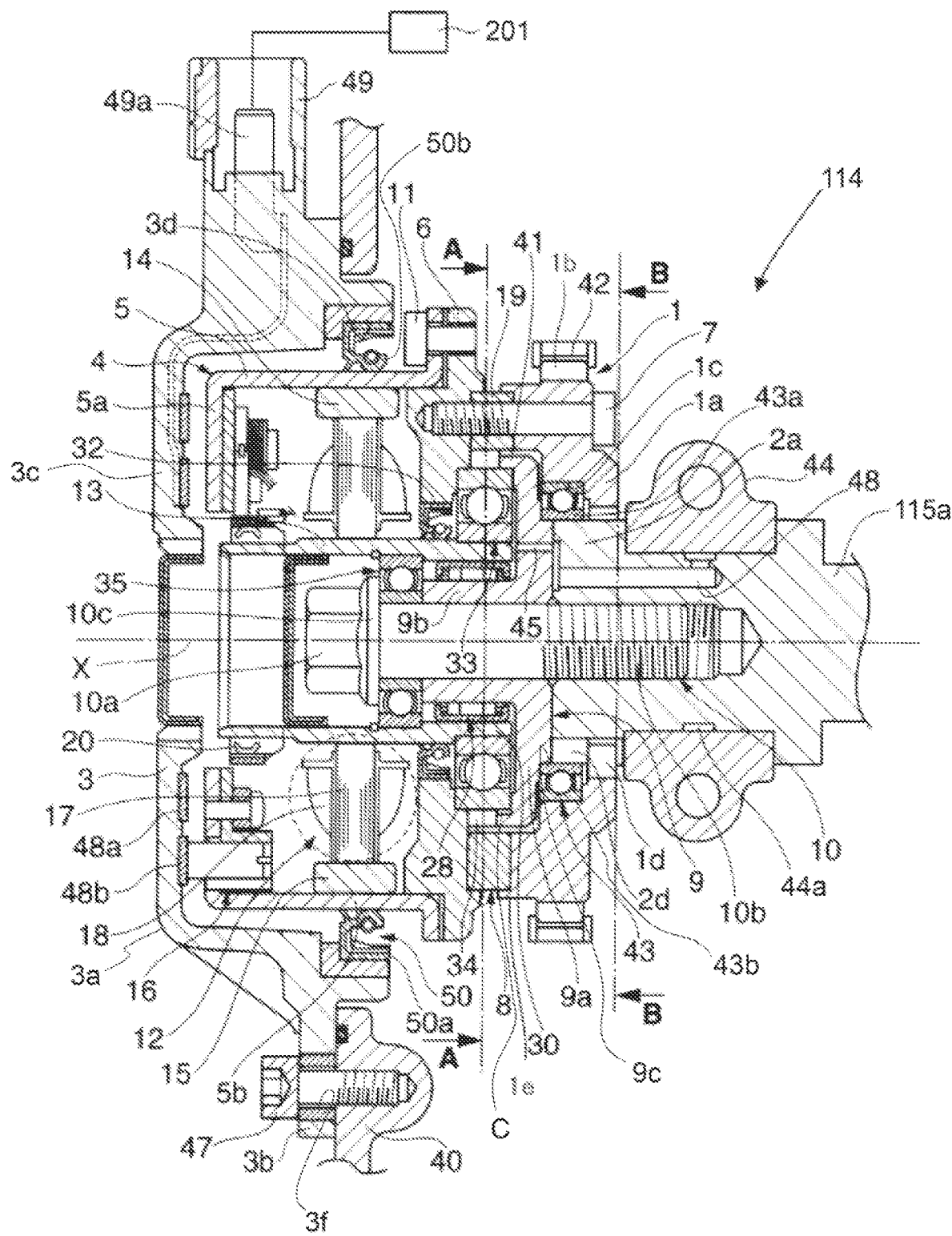
FIG. 3 is a cross-sectional view showing, in an extracted manner, the variable valve timing mechanism in FIGS. 1 and 2.
Figure 4:
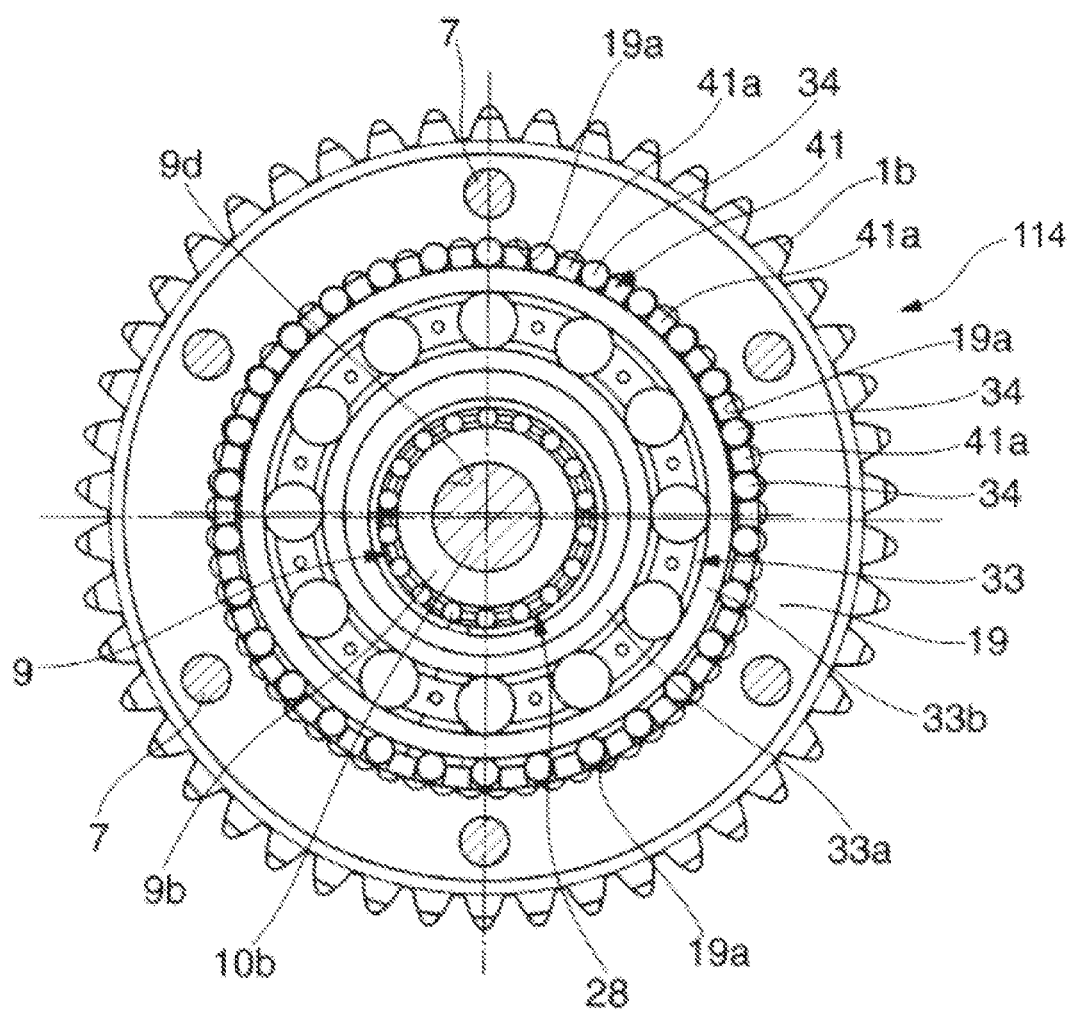
FIG. 4 is a cross-sectional view of the A-A line of FIG. 3.
Figure 5:
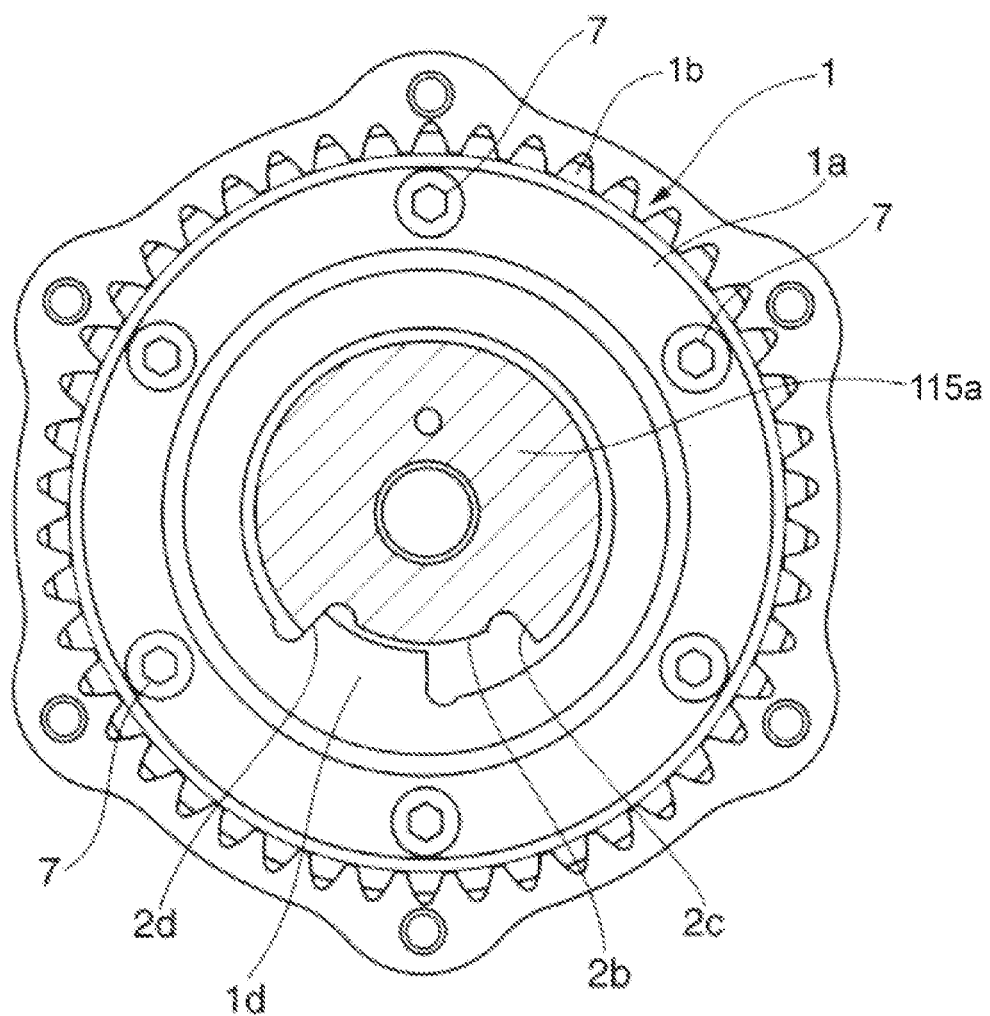
FIG. 5 is a cross-sectional view of the B-B line of FIG. 3.

FIGS. 3 to 5 each show an example of the structure of VTC mechanism 114 in FIGS. 1 and 2.

As shown in FIG. 3, VTC mechanism 114 includes a timing sprocket (cam sprocket) 1, which is a drive rotating body rotationally driven by crankshaft 109 of engine 100, intake camshaft 115a rotatably supported on a cylinder head via a bearing 44, and rotating by a rotational force transmitted from timing sprocket 1, a cover member 3 arranged at the front position of timing sprocket 1, and fixed by bolts to a chain cover 40, and a phase change mechanism 4, arranged between timing sprocket 1 and intake camshaft 115a, for changing a relative rotation phase angle of intake camshaft 115a with respect to timing sprocket 1.

Timing sprocket 1 is configured by a sprocket body 1a, and a gear part 1b, integrally provided on an outer periphery of sprocket body 1a, for receiving a rotational force from crankshaft 109 via a wound timing chain 42.

Furthermore, timing sprocket 1 is rotatably supported by intake camshaft 115a, by a third ball bearing 43 interposed between a circular groove 1c formed on the inner peripheral side of sprocket body 1a and the outer periphery of a flange part 2a integrally provided at the front end part of intake camshaft 115a.

An annular projection 1e is integrally formed on the outer peripheral edge of the front end part of sprocket body 1a.

An annular member 19, coaxially positioned on the inner peripheral side of annular projection 1e and having internal teeth 19a that are corrugated meshing parts formed on the inner periphery thereof, and an annular plate 6 are fastened and fixed together from an axial direction by bolts 7 on the front end part of sprocket body 1a.

Furthermore, as shown in FIG. 5, a stopper convex part 1d, which is an arc-shaped engaging part, is formed up to a predetermined length range along a circumferential direction on a part of the inner peripheral surface of sprocket body 1a.

A cylindrical housing 5 projecting forward in a state covering each component member of a speed reducer 8 and electric motor 12, which are described later, of phase change mechanism 4, is fixed by bolts 11 on the outer periphery of the front end side of plate 6.

Housing 5 is formed by an iron-based metal and functions as a yoke, integrally has an annular plate-shaped holding part 5a on the front end side, and is arranged in a shape in which the entire outer peripheral side including holding part 5a is covered by cover member 3 with a predetermined gap.

Intake camshaft 115a has a drive cam (not illustrated) operated to open intake valve 105 on the outer periphery, and couples a driven member 9, which is a driven rotating body, on the front end part from an axial direction by a cam bolt 10.

Furthermore, as shown in FIG. 5, a stopper concave groove 2b, which is an engaging part into which stopper convex part 1*d* of sprocket body 1*a* is engaged, is formed along the circumferential direction on flange part 2*a* of intake camshaft 115*a*.

Stopper concave groove 2*b* is formed in an arc shape with a predetermined length in the circumferential direction, and both end edges of stopper convex part 1*d* rotated in this length range make contact with each of opposing edges 2*c*, 2*d* in the circumferential direction, thereby regulating the relative rotation positions of a maximum advance angle side and a maximum delay angle side of intake camshaft 115*a* with respect to timing sprocket 1.

That is, an angle range in which stopper convex part 1*d* can move inside stopper concave groove 2*b* is a variable range of the relative rotation phase angle of intake camshaft 115*a* with respect to crankshaft 109, in other words, a variable range of valve timing.

A flange-shaped seat surface part 10*c* is integrally formed on the end edge of a shaft part 10*b* side on a head part 10*a* of cam bolt 10, and a male thread part, screwed into a female thread part formed in an internal axial direction from the end part of intake camshaft 115*a*, is formed on the outer periphery of shaft part 10*b*.

Driven member 9 is formed by an iron-based metal material, and is configured by a disk part 9*a* formed on the front end side, and a cylindrical-shape cylinder part 9*b* integrally formed on the rear end side, such as shown in FIG. 4.

An annular step protrusion 9*c*, with substantially the same outer diameter as flange part 2*a* of intake camshaft 115*a*, is integrally provided, at a substantially central position of the rear end surface in a radial direction, on disk part 9*a*.

Also, the outer peripheral surface of annular step protrusion 9*c* and the outer peripheral surface of flange part 2*a* are inserted and arranged on the inner periphery of an inner ring 43*a* of third ball bearing 43. An outer ring 43*b* of third ball bearing 43 is press-fitted and fixed to the inner peripheral surface of circular groove 1*c* of sprocket body 1*a*.

Furthermore, a holder 41 for holding multiple rollers 34 is integrally provided on the outer peripheral part of disk part 9*a*.

Holder 41 is formed by projecting from the outer peripheral part of disk part 9*a* in the same direction as cylinder part 9*b*, and is formed by multiple elongated protrusions 41*a* with a predetermined gap at positions of substantially equal intervals in the circumferential direction.

Cylindrical part 9*b* is formed through an insertion hole 9*d*, through the center of which shaft part 10*b* of cam bolt 10 is inserted, and a first needle bearing 28 is provided on the outer peripheral side of cylindrical part 9*b*.

Cover member 3 is formed by a synthetic resin material, and is configured by a cover body 3*a* swollen into a cup shape, and a bracket 3*b* integrally provided on the outer periphery of the rear end part of cover body 3*a*.

Cover body 3*a* is arranged so as to cover the front end side of phase change mechanism 4, that is, almost the entire rear end part side from a holding part 5*b* in the axial direction of housing 5, with a predetermined gap. On the other hand, bracket 3*b* is formed in a substantially annular shape, and bolt insertion holes 3*f* are formed through each of six boss parts.

Furthermore, in cover member 3, bracket 3*b* is fixed to chain cover 40 via multiple bolts 47, and inner and outer double slip rings 48*a*, 48*b* are embedded and fixed to the inner peripheral surface of a front end part 3*c* of cover body 3*a* in a state in which each inner end surface is exposed.

In addition, a connector part 49, to the inside of which is fixed a connecter terminal 49*a* connected via conductive members with slip rings 48*a*, 48*b*, is provided on the upper end part of cover member 3.

Note that power from a battery power supply, which is not shown, is supplied, via control device 201, to connector terminal 49*a*.

A large-diameter first oil seal 50, which is a sealing member, is interposed between the inner peripheral surface of the rear end side of cover body 3*a* and the outer peripheral surface of housing 5.

First oil seal 50 is formed with a substantially U-shaped cross section, has a core metal embedded inside a base material of synthetic rubber, and fits and fixes an annular base part 50*a* on the outer peripheral side inside circular groove 3*d* formed on the inner peripheral surface of the rear end part of cover body 3*a*.

Furthermore, a seal surface 50*b*, which makes contact with the outer peripheral surface of housing 5, is integrally formed on the inner peripheral side of annular base part 50*a* of first oil seal 50.

Phase change mechanism 4 is configured by electric motor 12 arranged substantially coaxially on the front end side of intake camshaft 115*a*, and speed reducer 8 that reduces the rotational speed of electric motor 12 and transmits this force to intake camshaft 115*a*.

Electric motor 12 is a DC motor with a brush, and includes housing 5, which is a yoke rotating integrally with timing sprocket 1, a motor shaft 13, which is an output shaft rotatably provided inside housing 5, a pair of semicircular arc-shaped permanent magnets 14, 15 fixed to the inner peripheral surface of housing 5, and a stator 16 fixed to the inner bottom surface side of holding part 5*a*.

Motor shaft 13 is formed in a cylindrical shape and functions as an armature, an iron core rotor 17 with multiples poles is fixed to the outer periphery at a substantially central position in the axial direction, and an electromagnetic coil 18 is wound around the outer periphery of iron core rotor 17.

Furthermore, a commutator 20 is press-fitted and fixed to the outer periphery of the front end part of motor shaft 13, and electromagnetic coil 18 is connected to commutator 20 at each one of segments divided into the same number as the number of poles of iron core rotor 17.

Motor shaft 13 is rotatably supported, via first needle bearing 28, which is a first bearing, and a fourth ball bearing 35, which is a bearing arranged on the side part of first needle bearing 28 in the axial direction, on the outer peripheral surface of shaft part 10*b* on head part 10*a* side of cam bolt 10.

Furthermore, a cylindrical-shaped eccentric shaft part 30, which constitutes a part of speed reducer 8, is integrally provided in the rear end part on intake camshaft 115*a* side of motor shaft 13.

In addition, a second oil seal 32, which is a friction member for preventing leakage of lubricating oil from the inside speed reducer 8 to the inside of electric motor 12, is provided between the outer peripheral surface of motor shaft 13 and the inner peripheral surface of plate 6.

Second oil seal 32 imparts frictional resistance with respect to the rotation of motor shaft 13, by having an inner peripheral part elastically contact with the outer peripheral surface of motor shaft 13.

Speed reducer 8 is mainly configured by eccentric shaft part 30 for performing eccentric rotational movement, a second ball bearing 33, which is a second bearing provided on the outer periphery of eccentric shaft part 30, rollers 34 provided on the outer periphery of second ball bearing 33, holder 41 for permitting rollers 34 to move in the radial direction while being held in a rolling direction, and driven member 9 integrated with holder 41.

The shaft center of a cam surface formed on the outer peripheral surface of eccentric shaft part 30 is slightly eccentric from a shaft center X of motor shaft 13 to the radial direction. A planetary meshing part is configured by second ball bearing 33, rollers 34 or the like.

Second ball bearing 33 is formed with a large diameter shape and arranged in a state in which substantially overlaps at a radial direction position of first needle bearing 28, inner ring 33a of second ball bearing 33 is press-fitted and fixed to the outer peripheral surface of eccentric shaft part 30, and rollers 34 are constantly in contact with the outer peripheral surface of outer ring 33b of second ball bearing 33.

Furthermore, an annular gap C is formed on the outer peripheral side of outer ring 33b, and the entirety of second ball bearing 33 can move in the radial direction in accordance with the eccentric rotation of eccentric shaft part 30, that is, eccentric movement is possible.

Each roller 34 is fitted into internal teeth 19a of annular member 19 while moving in the radial direction in accordance with the eccentric movement of second ball bearing 33, and performs a rocking motion in the radial direction while being guided in the circumferential direction by protrusions 41a of holder 41.

Lubricating oil is supplied from a lubricating oil supply mechanism to the inside of speed reducer 8.

The lubricating oil supply mechanism is configured by an oil supply passage 44a formed inside bearing 44 of the cylinder head and through which lubricating oil is supplied from a main oil gallery, which is not shown, an oil supply hole 48 formed in the axial direction inside intake cam shaft 115a and communicating with oil supply passage 44a via a grooved groove, a small-diameter oil supply hole 45 formed through the inside of driven member 9 in the axial direction, with one end opened at oil supply hole 48, and another end opened near first needle bearing 28 and second ball bearing 33, and three large-diameter oil discharge holes (not shown) formed through same driven member 9.

Next, the operation of VTC mechanism 114 will be described.

First, when crankshaft 109 of engine 100 is rotationally driven, timing sprocket 1 rotates via timing chain 42, and this rotational force causes electric motor 12 to rotate synchronously via housing 5, annular member 19, and plate 6.

On the other hand, the rotational force of annular member 19 is transmitted from rollers 34 to intake camshaft 115a via holder 41 and driven member 9. As a result of this, the cam of intake camshaft 115a is operated to open and close intake valve 105.

Then, control device 201 energizes electromagnetic coil 18 of electric motor 12 and drives electric motor 12, at the time when changing the relative rotation phase angle of intake camshaft 115a with respect to crankshaft 109, that is, the valve timing of intake valve 105, by VTC mechanism 114. When electric motor 12 is rotationally driven, the rotational force of the motor is transmitted to intake camshaft 115a via speed reducer 8.

That is, when eccentric shaft part 30 rotates eccentrically in accordance with the rotation of motor shaft 13, each roller 34 moves over one of internal teeth 19a of annular member 19 while being guided to the radial direction by protrusions 41a of holder 41 for each rotation of motor shaft 13, moves while rolling to another adjacent one of internal teeth 19a, and rolls in contact to the circumferential direction while repeating this order.

The rotational force is transmitted to driven member 9 while the rotation of motor shaft 13 is reduced by roll-contact of each roller 34. Note that, a reduction ratio at the time when the rotation of motor shaft 13 is transmitted to driven member 9 can be freely set in accordance with the number of rollers 34 or the like.

As a result of this, the relative rotation phase angle is converted by forward and reverse relative rotation of intake camshaft 115a with respect to timing sprocket 1, and the opening and closing timing of intake valve 105 is changed to an advance angle side or a delay angle side.

Here, the forward and reverse relative rotation of intake camshaft 115a with respect to timing sprocket 1 is regulated by the fact that each side surface of stopper convex part 1d makes contact with either one of opposing edges 2c, 2d of stopper concave groove 2b.

That is, driven member 9 rotates in the same direction as the rotation direction of timing sprocket 1 in accordance with the eccentric rotation of eccentric shaft part 30, thereby one side surface of stopper convex part 1d makes contact with opposing edge 2c on one side of stopper concave groove 2b, and further rotation in the same direction is regulated. As a result of this, in intake camshaft 115a, the relative rotation phase angle with respect to timing sprocket 1 is changed to a maximum to an advance angle side.

On the other hand, when driven member 9 rotates in the opposite direction to the rotation direction of timing sprocket 1, the other side surface of stopper convex part 1d makes contact with opposing edge 2d on the other side of stopper concave groove 2b, and rotation in the same direction hereafter is regulated. As a result of this, in intake camshaft 115a, the relative rotation phase angle with respect to timing sprocket 1 is changed to a maximum to a delay angle side.

In this way, control device 201 variably controls the relative rotation phase angle of intake camshaft 115a with respect to crankshaft 109, that is, the valve timing of intake valve 105, by controlling the energization of electric motor 12 of VTC mechanism 114.

Control device 201 computes a target phase angle (in other words, a target advance angle amount, target valve timing, target conversion angle) based on an operation state of engine 100, for example, the engine load, engine rotation speed, engine temperature, starting state or the like, while on the other hand, detects an actual relative rotation phase angle of intake camshaft 115a with respect to crankshaft 109.

Also, control device 201 performs feedback control of the rotation phase, which computes and outputs an operation amount of electric motor 12 so that the actual relative rotation phase angle approaches the target phase angle. In the feedback control, control device 201 computes an operation amount of electric motor 12, for example, by proportional integral control or the like based on a deviation between the target phase angle and the actual relative rotation phase angle.

Note that the structure of VTC mechanism 114 is not limited to that illustrated in FIGS. 3-5. Other configurations can also be used, provided that a voltage is applied to a DC motor with a brush only during phase conversion and a motor shaft part is rotated with respect to a sprocket part so as to convert the phase of a camshaft part.

Figure 6:
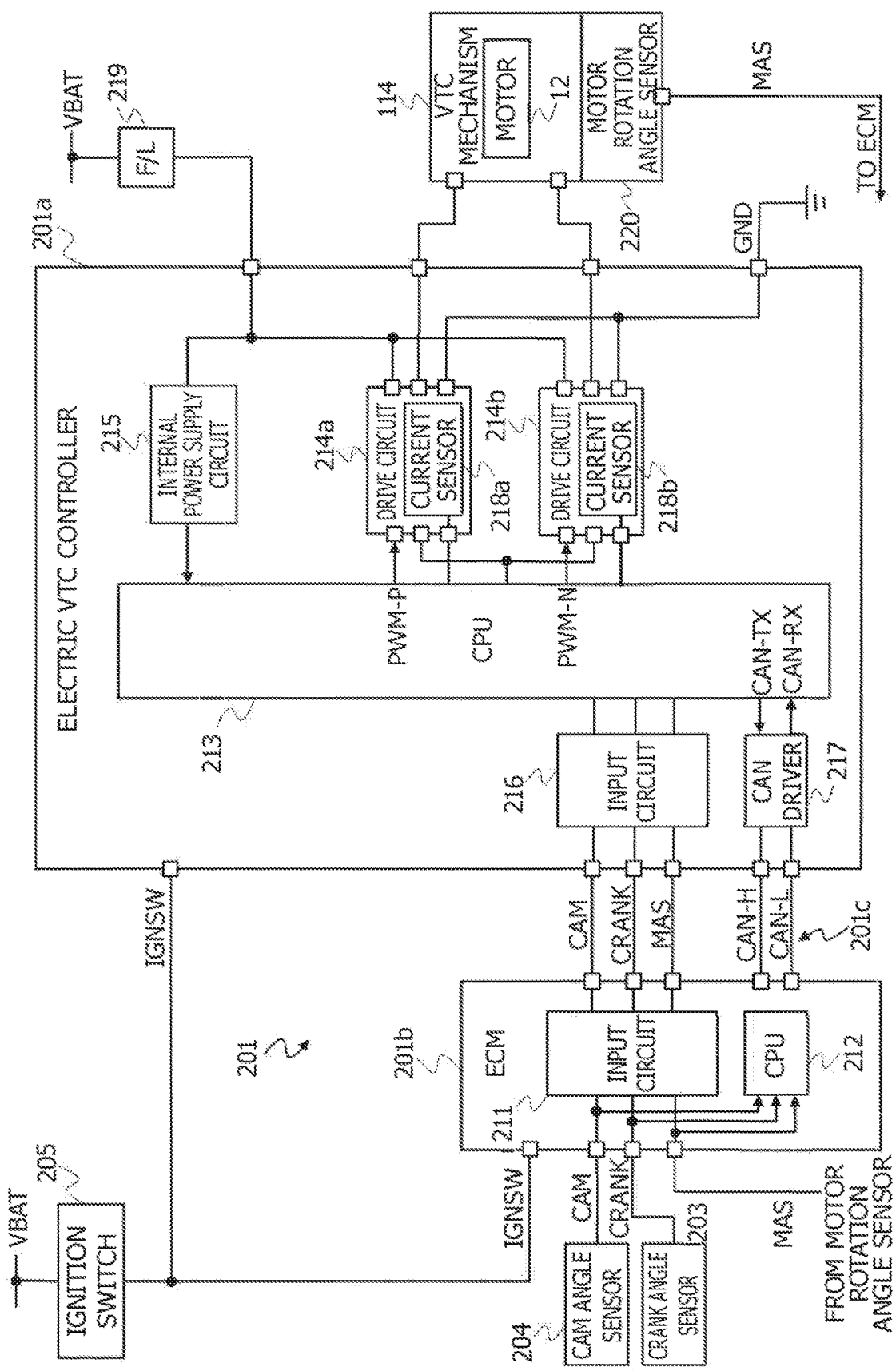
FIG. 6 is a block diagram showing, in an extracted manner, elements relating to the control of the variable valve timing mechanism in the control device of FIG. 1.

FIG. 6 shows a configuration example of elements relating to the control of VTC mechanism 114, extracted from control device 201 shown in FIG. 1. Signal IGNSW from ignition switch 205 connected to a battery VBAT is input to each of ECM 201b and electric VTC controller 201a, and is activated by turning the ignition ON. ECM 201b includes an input circuit 211 and a CPU 212. Cam sensor signal CAM from cam angle sensor 204, crank sensor signal CRANK from crank angle sensor 203, and motor shaft rotation angle signal MAS from motor rotation angle sensor 220 are input to each of input circuit 211 and CPU 212. ECM 201b controls fuel injection valve 106, ignition module 116 or the like based on these signals.

Note that, here, while a configuration is shown in which motor shaft rotation angle signal MAS is input to ECM 201b, it may be a configuration in which motor shaft rotation angle signal MAS is input to electric VTC controller 201a, without going through ECM 201b.

CPU 212 computes, for example, a target value (target phase angle) of the rotation phase adjusted by VTC mechanism 114 based on an engine operating state, and computes a rotation phase based on crank sensor signal CRANK from crank angle sensor 203 and cam sensor signal CAM of intake cam shaft 115a. In addition, it has a function for transmitting the computed target value, the computed rotation phase or the like toward electric VTC controller 201a by CAN communication. In the case of a configuration in which motor shaft rotation angle signal MAS is input to electric VTC controller 201a without going through ECM 201b, the target value or the like, which excludes the rotation phase, is transmitted toward electric VTC controller 201a by CAN communication.

On the other hand, electric VTC controller 201a includes a CPU 213, drive circuits 214a, 214b, an internal power supply circuit 215, an input circuit 216, a CAN driver circuit 217 or the like. A power supply terminal and a ground (GND) terminal of electric VTC controller 201a are connected to battery VBAT. As a result of this, power is supplied to drive circuits 214a, 214b and internal power supply circuit 215 via a fusible link 219. Internal power supply circuit 215 generates an internal power supply voltage of 5V, for example, by stepping down the voltage of battery VBAT, and supplies this voltage to each circuit within electric VTC controller 201a that includes CPU 213.

Cam sensor signal CAM from cam angle sensor 204, crank sensor signal CRANK from crank angle sensor 203, and motor shaft rotation angle signal MAS are input to input circuit 216, via input circuit 211 of ECM 201b, and signal CAM, signal CRANK, and signal MAS are input to CPU 213.

On the other hand, in the case of a configuration in which motor shaft rotation angle signal MAS is input to electric VTC controller 201a without going through ECM 201b, cam sensor signal CAM from cam angle sensor 204 and crank sensor signal CRANK from crank angle sensor 203 are input to input circuit 216, via input circuit 211 of ECM 201b, and signal CAM and signal CRANK are input to CPU 213.

CAN driver circuit 217 is for performing CAN communication between electric VTC controller 201a and ECM 201b, transmits transmission information CAN_TX from CPU 213 to ECM 201b, and receives reception information CAN_RX from ECM 201b by CPU 213.

Each drive circuit 214a, 214b controls energization of VTC mechanism 114 to electric motor 12, based on a Pulse Width Modulation (PWM) signal PWM-P, PWM-N output from CPU 213. Each drive circuit 214a, 214b includes a current sensor 218a, 218b, and detects the current flowing through the winding of electric motor 12, and inputs this fact to CPU 213.

Next, the results of discussion on the calculation of a VTC detection angle in a VTC mechanism of the above-described configuration will be described.

FIGS. 7A and 7B are each a timing chart for describing a conventional calculation method of a VTC detection angle (CAM detection angle). As shown in FIG. 7A, a VTC detection angle (from a CRANK reference position until the arrival of a CAM signal pulse) is expressed as:

VTC detection angle=angle control portion+time control portion

Here, the angle control portion is a portion time-converted by counting the number of CRANK signal pulses from the CRANK reference position until the arrival of the CAM signal pulse, and is expressed by:

Number of CRANK signal pulses between [reference position to CAM signal]×10 [deg. CA]

The time control portion is:

(ΔA/ΔB)×10 [deg. CA]

Here, 10 [deg. CA] is the interval of CRANK signal pulses (CRANK teeth), ΔA is the time from an immediately prior CRANK signal to the CAM signal, and ΔB is the time between immediately prior CRANK signals. Note that, [between CRANK signals] means [between CRANK signal pulses], and is between times t0-t1, times t1-t2, times t3-t4 or the like.

As shown in FIG. 7B, if the engine speed suddenly rises at the timing between times t4-t5, the [time ΔB between immediately prior CRANK signals] will vary (refer to the arrow ΔX in FIG. 7A), and thereby, the time control portion will be erroneously computed. If such a deviation between the computed result and the true value is repeated, a deflection of the VTC detection angle will occur.

Discussion 1

Figure 8A:
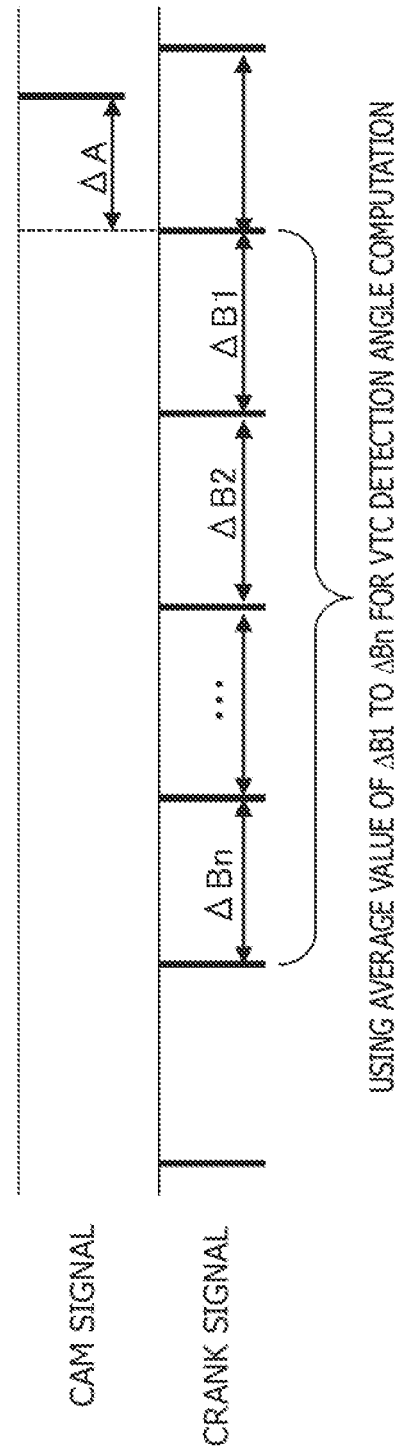
FIG. 8A is a timing chart for discussing a calculation method of a VTC detection angle (CAM detection angle).

FIGS. 8A and 8B are each a timing chart discussing a calculation method of a VTC detection angle (CAM detection angle). As shown in FIG. 8A, by using [average value of most recent multiple portions] instead of [time between immediately prior CRANK signals] for a computation of the time control portion, the influence of erroneous computations on the time control portion is suppressed. That is, an average value of times ΔB1, ΔB2, . . . , ΔBn between CRANK signal pulses is used for a computation of the VTC detection angle. Alternatively, [time between immediately prior CRANK signals] and [average value of most recent multiple portions] are used together.

As a result of this, as shown in FIG. 8B, the time between CRANK signals approaches the true value even if the engine speed suddenly rises at the timing between times t4-t5, and the influence by rotation variations can be reduced.

In this way, when calculating the VTC detection angle (time control portion), the influence of rotation variations of the engine can be suppressed, by smoothing the time between CRANK signals.

Discussion 2

Figure 9A:
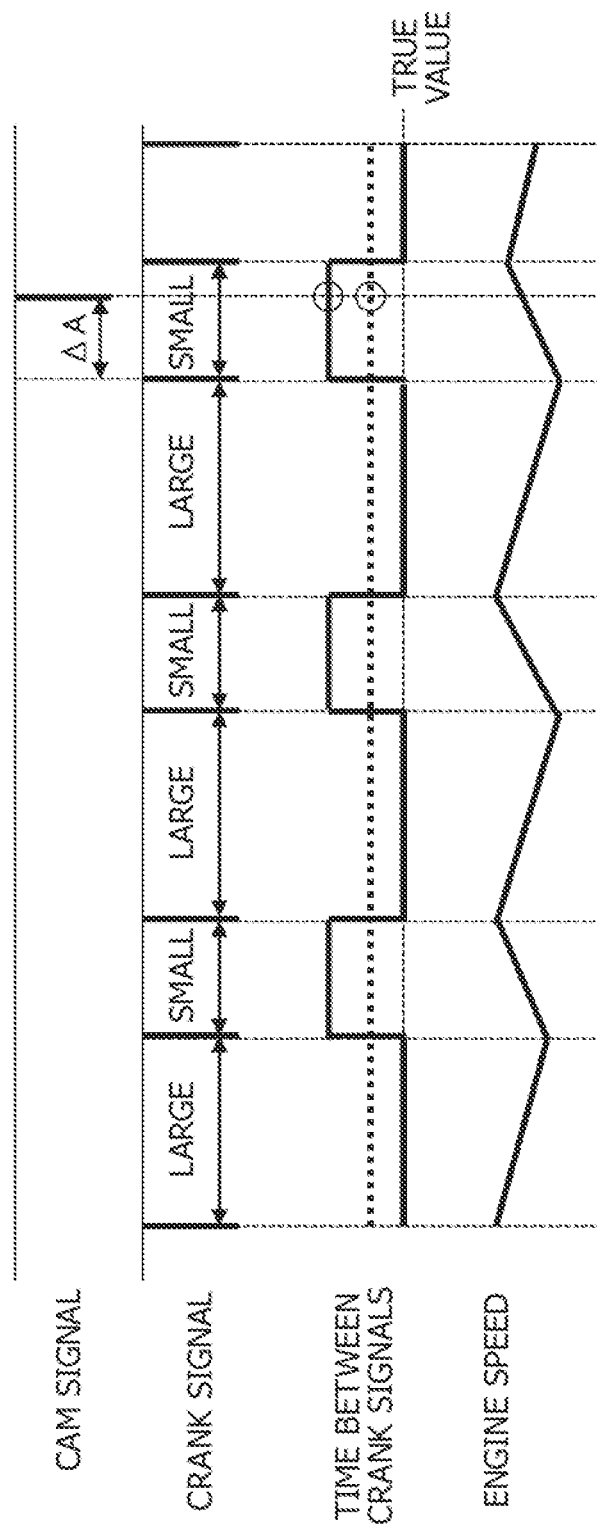
FIG. 9A is a timing chart for discussing a change of a calculation method of a VTC detection angle.

FIGS. 9A and 9B are each a timing chart discussing switching of a calculation method of a VTC detection angle, and changes (switches) the calculation method depending on the immediately prior rotation variation condition. FIG. 9A shows variations (hunting) due to rotational sway of the engine, and FIG. 9B shows variations due to an increase in rotation of the engine (similar for a decrease in rotation).

As shown in FIG. 9A, in the case of variations in which the time between CRANK signals is large or small at the time when viewed in sections that are minute, an angle can be computed more accurately by using an average value.

On the other hand, as shown in FIG. 9B, in the case of variations in which the time between CRANK signals constantly decreases (or increases) when viewed in minute sections, an angle can be computed more accurately by using the immediately prior one portion.

Accordingly, the VTC detection angle can be calculated more accurately, by changing the computation method depending on the immediately prior rotation variation condition of the engine.

Discussion 3

Figure 10:
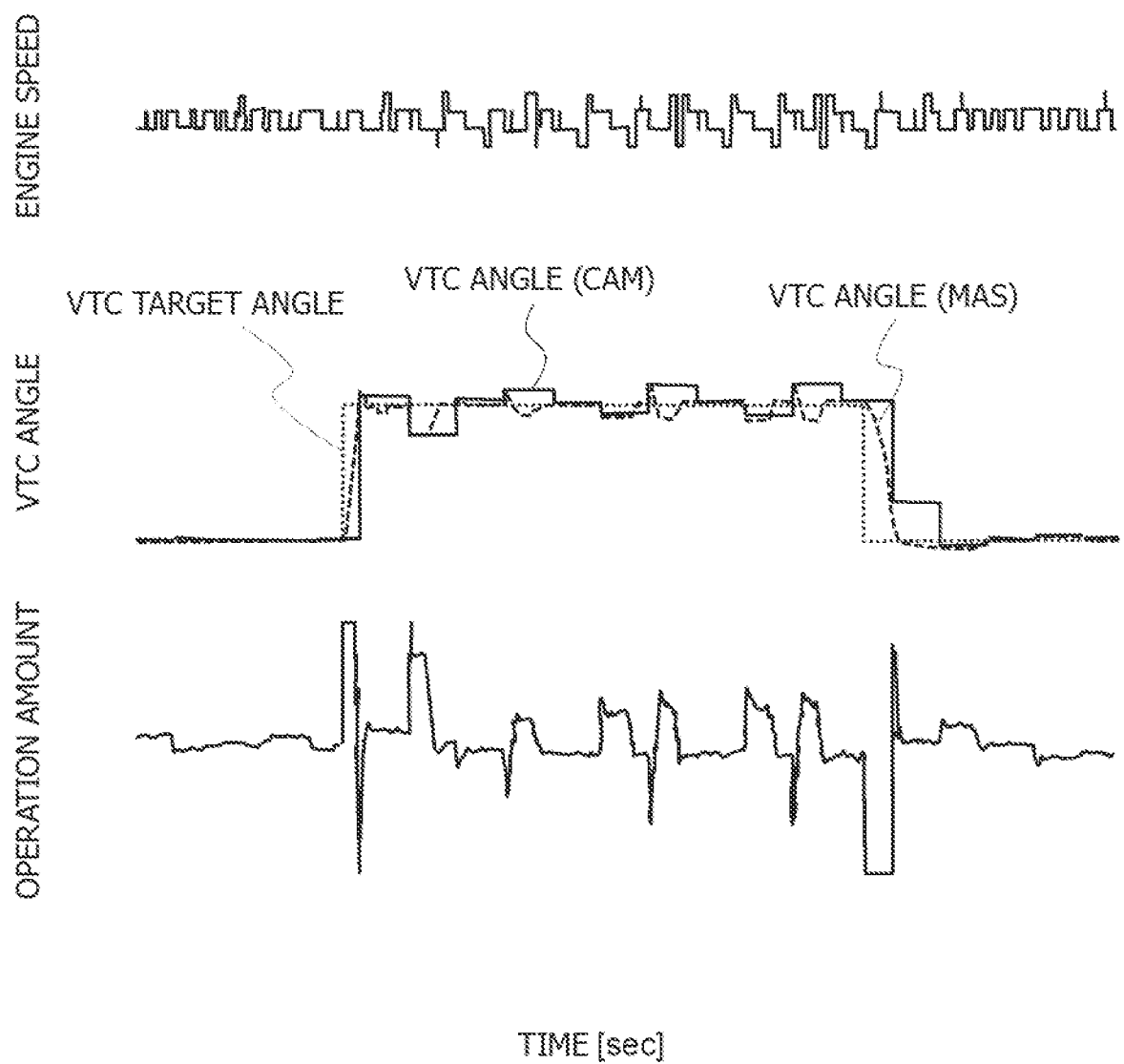
FIG. 10 is a waveform diagram for discussing the influence of a difference in engine speed on an operation amount (erroneous computation).
Figure 11:
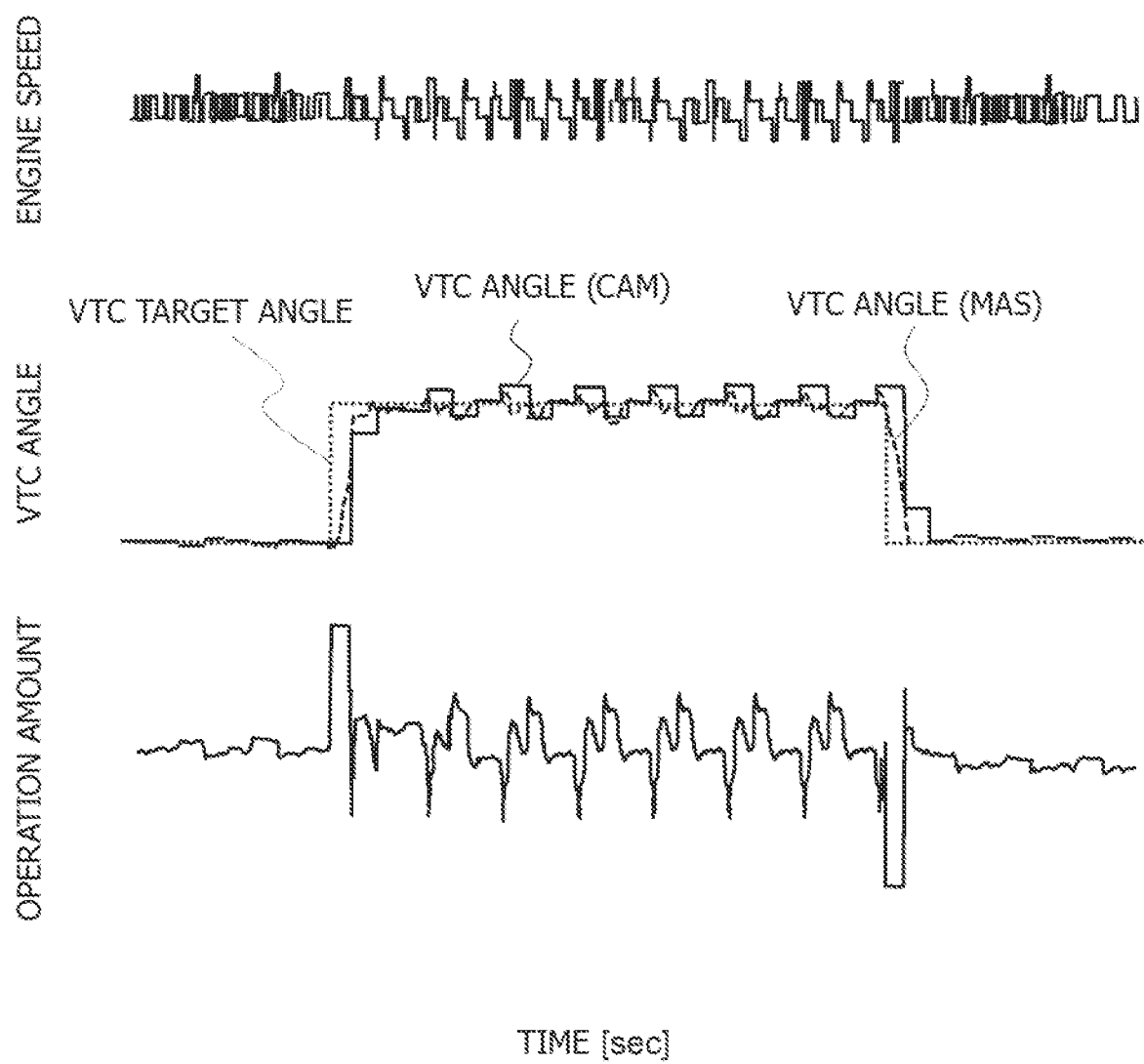
FIG. 11 is a waveform diagram for discussing the influence of a difference in engine speed on an operation amount (erroneous computation).

FIGS. 10 and 11 each discusses the influence of a difference in engine speed on an erroneous computation, and show a relationship between engine speed, VTC angle, and operation amount. FIG. 10 shows an engine with a low rotation, and FIG. 11 shows an engine with a higher rotation than that of FIG. 10.

As is clear by comparing FIGS. 10 and 11, it can be understood that deflections of an operation amount occur with smaller rotation variations as the rotation of the engine decreases.

Discussion 4

FIGS. 12A to 12C discuss a permitted rotation variation width in accordance with the engine speed, and show a rotation variation width in which deflections of a VTC detection angle are contained within (are temporary placed) a steady-state deviation requirement of ±1.5 [deg. CA]. FIG. 12A is a reference example of the case in which the time control portion is at a maximum value (normal position), FIG. 12B is a reference example of the case in which the time control portion is at a maximum value (non-toothed part), and FIG. 12C is a reference example of the case in which the time control portion is at a minimum value.

As shown in FIGS. 12A to 12C, the permitted rotation variation width differs in accordance with the engine speed, and the permitted rotation variation width differs in accordance with the magnitude of the time control portion. The rotation variation width narrows as the time control portion increases. Also, the permitted rotation variation width narrows as the engine speed decreases.

Therefore, it is necessary to take into consideration the engine speed for a change of the calculation method of a rotation phase of the variable valve timing mechanism. For example, it is better to set a predetermined engine speed beforehand, and to perform switching at the time when it is lower than this.

Next, computation methods of a rotation phase of a VTC mechanism based on these discussions will be described.

First Embodiment

Figure 13:
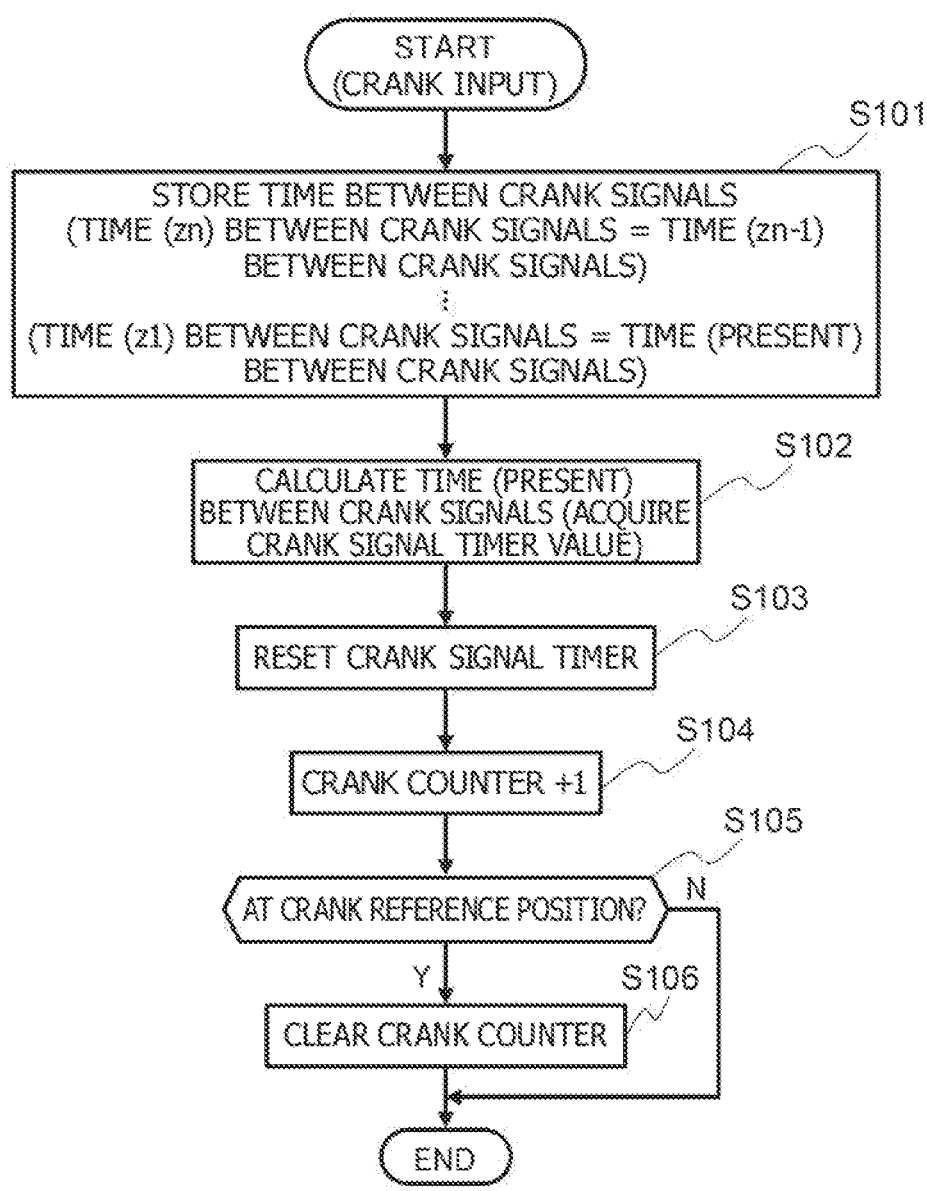
FIG. 13 is a flowchart showing a first embodiment for calculating a rotation phase of a VTC mechanism, when a computation cycle is a crank interrupt cycle.
Figure 14:
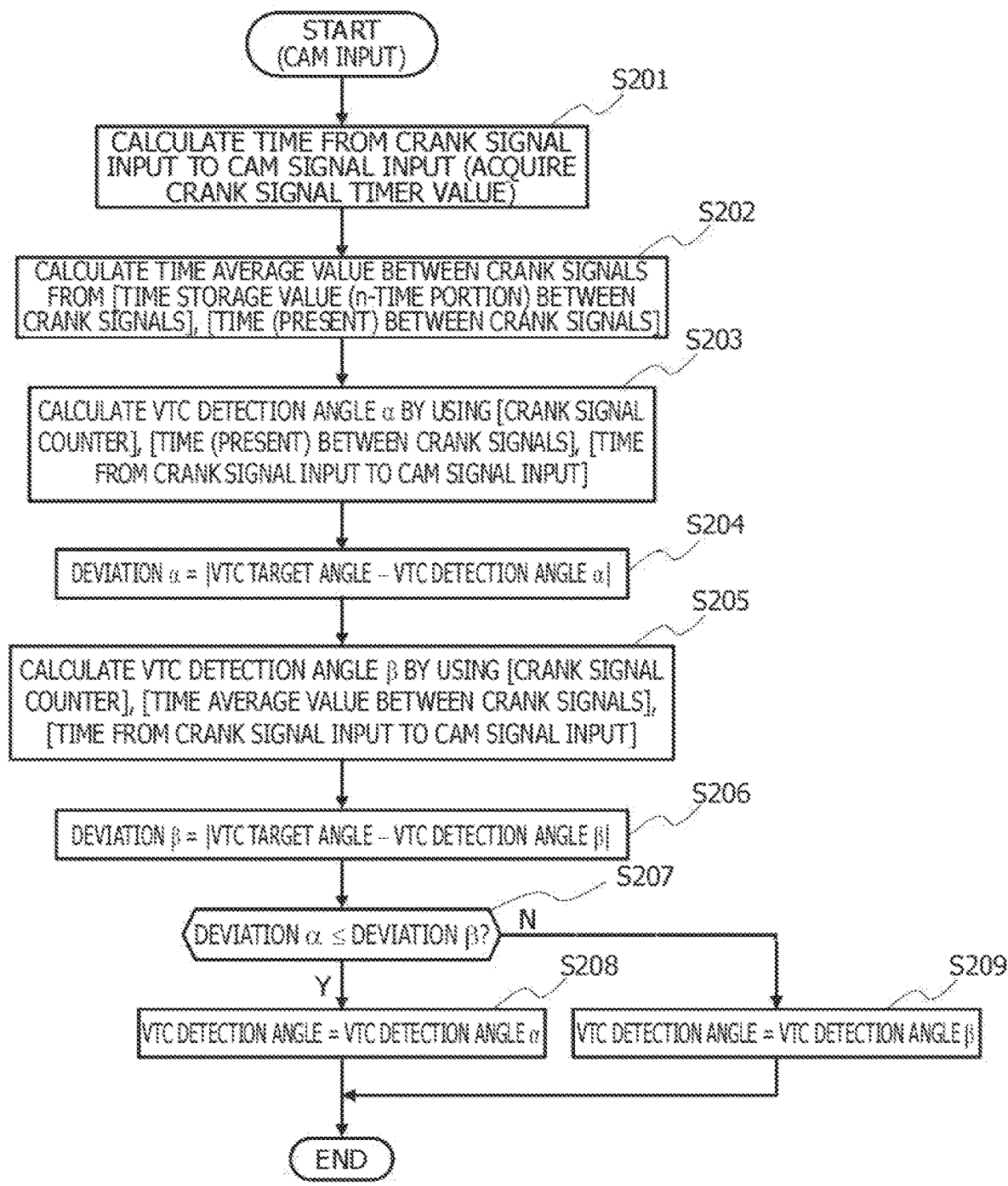
FIG. 14 is a flowchart showing a first embodiment for calculating a rotation phase of a VTC mechanism, when a computation cycle is a cam interrupt cycle.

FIGS. 13 and 14 are flowcharts showing a first embodiment for calculating a rotation phase of a VTC mechanism. FIG. 13 shows a CRANK input and FIG. 14 shows a CAM input, a time average value between CRANK signals is calculated, and a selection of an angle value is performed.

In a CRANK input, each time between CRANK signals from an n-previous time up to the present time is stored (step S101). Next, a timer value of the CRANK signal is acquired, and the time (present) between CRANK signals is calculated (step S102). Subsequently, after resetting the timer of the CRANK signal (step S103), a CRANK counter is incremented by +1 (step S104). Then, whether or not it is at the CRANK reference position is determined (step S105), and if it is at the reference position, the process ends by clearing the CRANK counter (step S106), and if it is not at the reference position, the process ends as it is.

On the other hand, in a CAM input, first, a CRANK timer value is acquired, and the time from a CRANK signal input to a CAM signal input is calculated (step S201). Next, a time average value between CRANK signals is calculated from [time storage value (n-time portion) between CRANK signals] and [time (present) between CRANK signals] (step S202). Subsequently, VTC detection angle α is calculated by using [CRANK signal counter], [time (present) between CRANK signals], and [time from CRANK signal input to CAM signal input] (step S203). Then, deviation α is obtained, in accordance with the following equation (step S204).

Deviation α=|VTC target angle−VTC detection angle α|

Subsequently, VTC detection angle 3 is calculated by using [CRANK signal counter], [time average value between CRANK signals], and [time from CRANK signal input to CAM signal input] (step S205). Then, deviation p is obtained, in accordance with the following equation (step S206).

Deviation β=|VTC target angle−VTC detection angle β|

Subsequently, whether or not [deviation α≤deviation β] (step S207) is determined. If [deviation α≤deviation β] is established, the process ends by setting to [VTC detection angle=VTC detection angle α] (step S208), and if [deviation α≤deviation β] is not established, the process ends by setting to [VTC detection angle=VTC detection angle β](step S209).

In this way, in the first embodiment, a time average value between CRANK signals is calculated, and the angle with the smaller deviation from a target is selected as the true value of the VTC angle.

Second Embodiment

Figure 15:
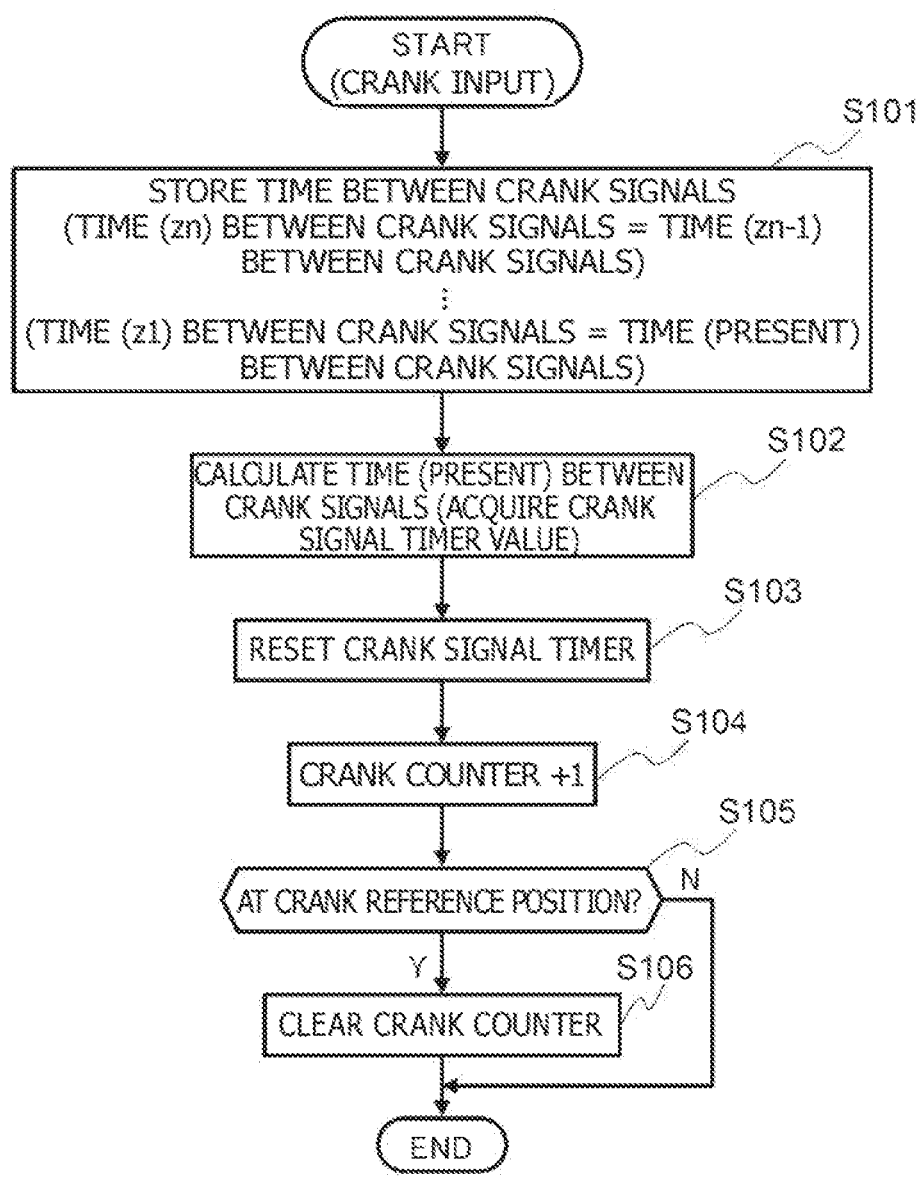
FIG. 15 is a flowchart showing a second embodiment for calculating a rotation phase of a VTC mechanism, when a computation cycle is a crank interrupt cycle.
Figure 16:
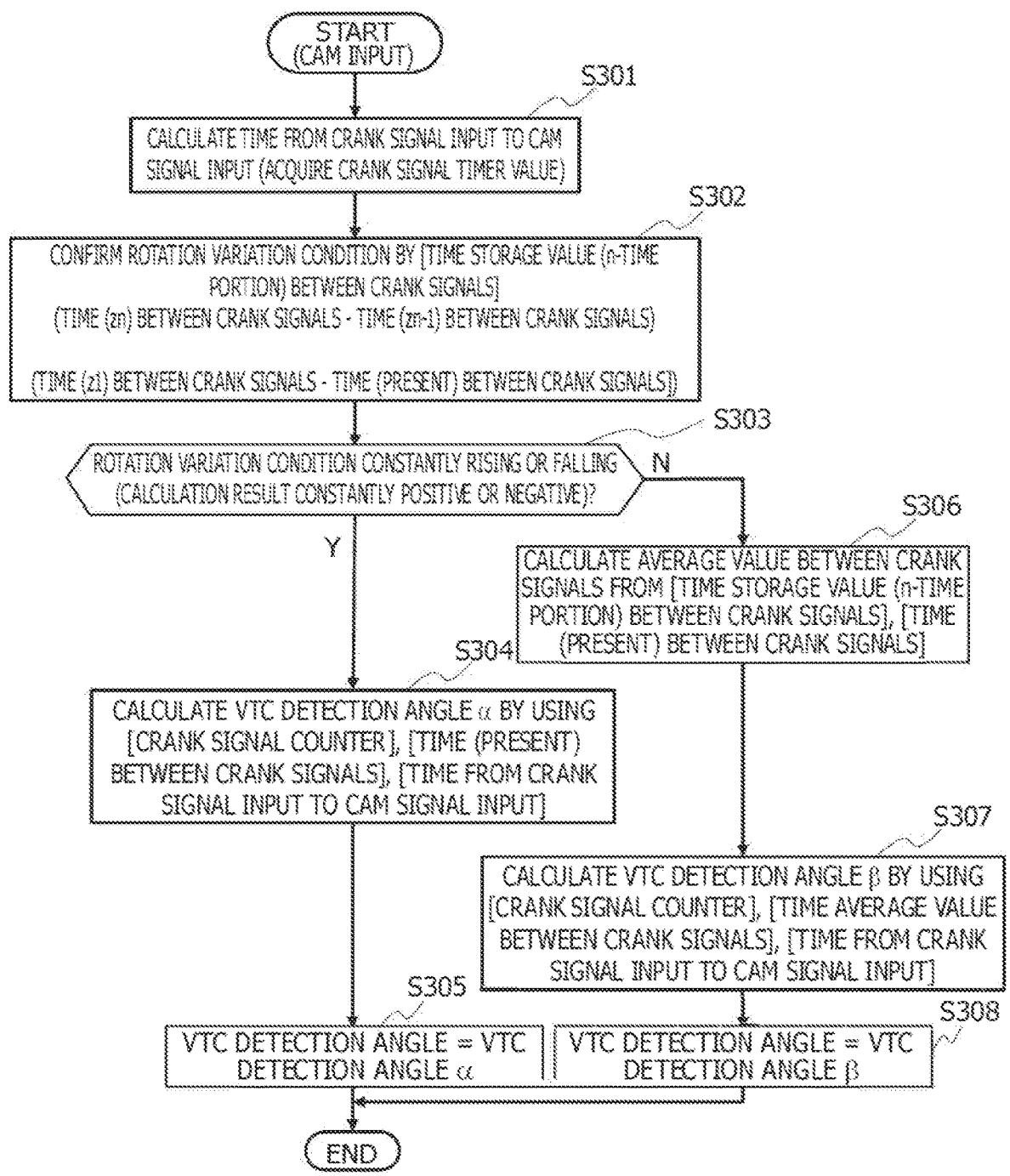
FIG. 16 is a flowchart showing a second embodiment for calculating a rotation phase of a VTC mechanism, when a computation cycle is a cam interrupt cycle.

FIGS. 15 and 16 are flowcharts showing a second embodiment for calculating a rotation phase of a VTC mechanism. FIG. 15 shows a CRANK input, FIG. 16 shows a CAM input, and these flowcharts show another example of a change of a calculation method. Since the CRANK input is the same as in FIG. 11, the same reference numerals are attached to the same portions, and detailed description thereof will be omitted.

In a CAM input, such as shown in FIG. 16, first, a CRANK timer value is acquired, and the time from a CRANK signal input to a CAM signal input is calculated (step S301). Next, in order to confirm a rotation variation condition of the engine from [time storage value (n-time portion) between CRANK signals], a computation of [time (Zn) between CRANK signals−time (Zn−1) between CRANK signals], . . . , [time (Z1) between CRANK signals−time (present) between CRANK signals] is performed (step S302). Subsequently, whether or not the rotation variation condition of the engine is constantly rising or falling, in other words, whether or not the calculation result of step S302 is constantly positive or negative, is determined (step S303).

When it is determined that the rotation variation condition of the engine is constantly rising or falling, VTC detection angle α is calculated by using [CRANK signal counter], [time (present) between CRANK signals], and [time from CRANK signal input to CAM signal input] (step S304).

Then, the process ends by setting VTC target angle α to calculated VTC detection angle α (step S305).

On the other hand, when it is determined that the rotation variation condition of the engine is not constantly rising or falling in step S303, a time average value between CRANK signals is calculated from [time storage value (n-time portion) between CRANK signals] and [time (present) between CRANK signals] (step S306).

Subsequently, VTC detection angle β is calculated by using [CRANK signal counter], [time average value between CRANK signals], and [time from CRANK signal input to CAM signal input] (step S307). Then, the process ends by setting the VTC target angle to calculated VTC detection angle β (step S308).

As a result of this, when the engine rotation is constantly rising or falling, VTC detection angle α calculated at a time between immediately prior pulses of CRANK signals is selected, and when the engine rotation is repeatedly rising and falling, VTC detection angle β calculated at an average time is selected.

In this way, in the second embodiment, a calculation of a VTC angle is performed by selecting a time between immediately prior pulses of CRANK signals and an average time, depending on whether or not the variation condition of the engine rotation is constantly rising or falling.

Third Embodiment

Figure 17:
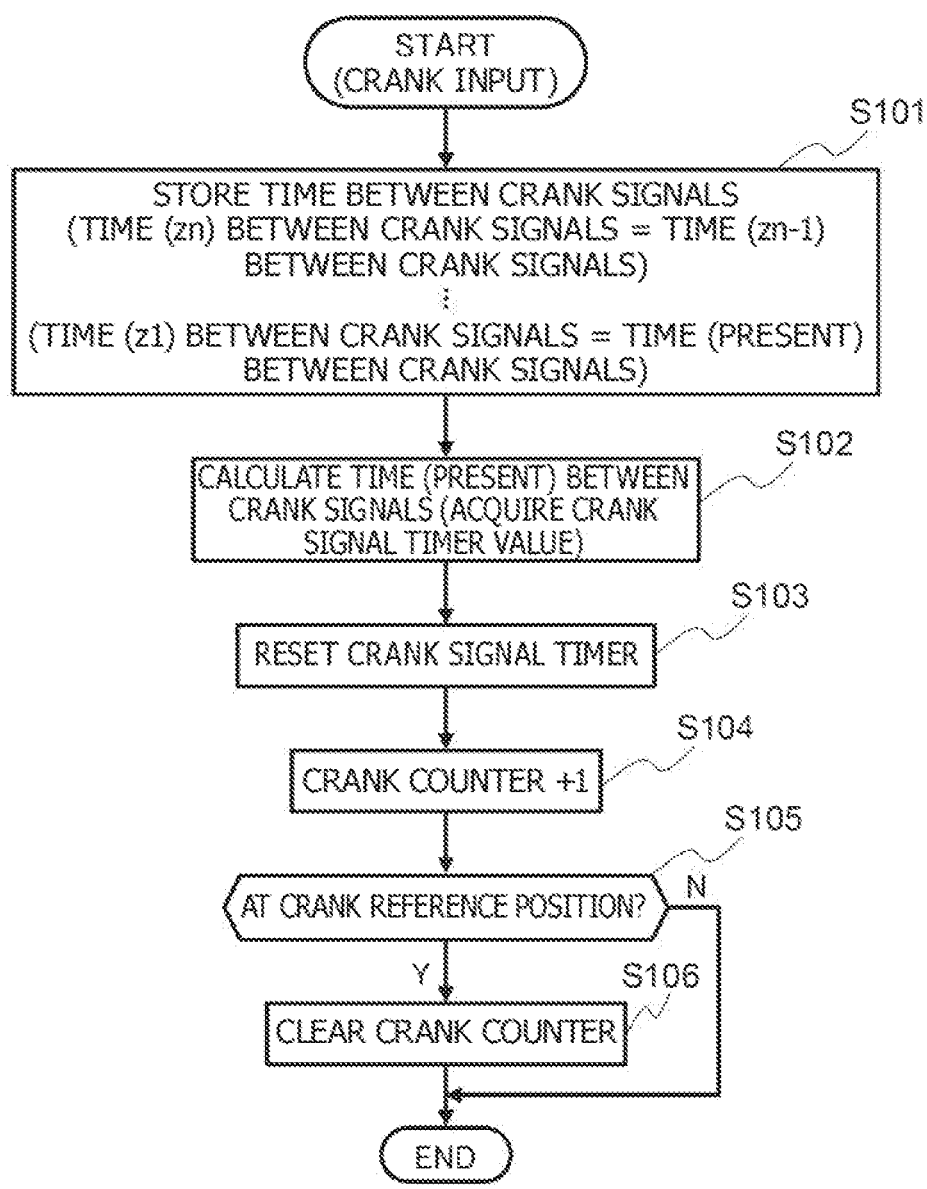
FIG. 17 is a flowchart showing a third embodiment for calculating a rotation phase of a VTC mechanism, when a computation cycle is a crank interrupt cycle.
Figure 18:
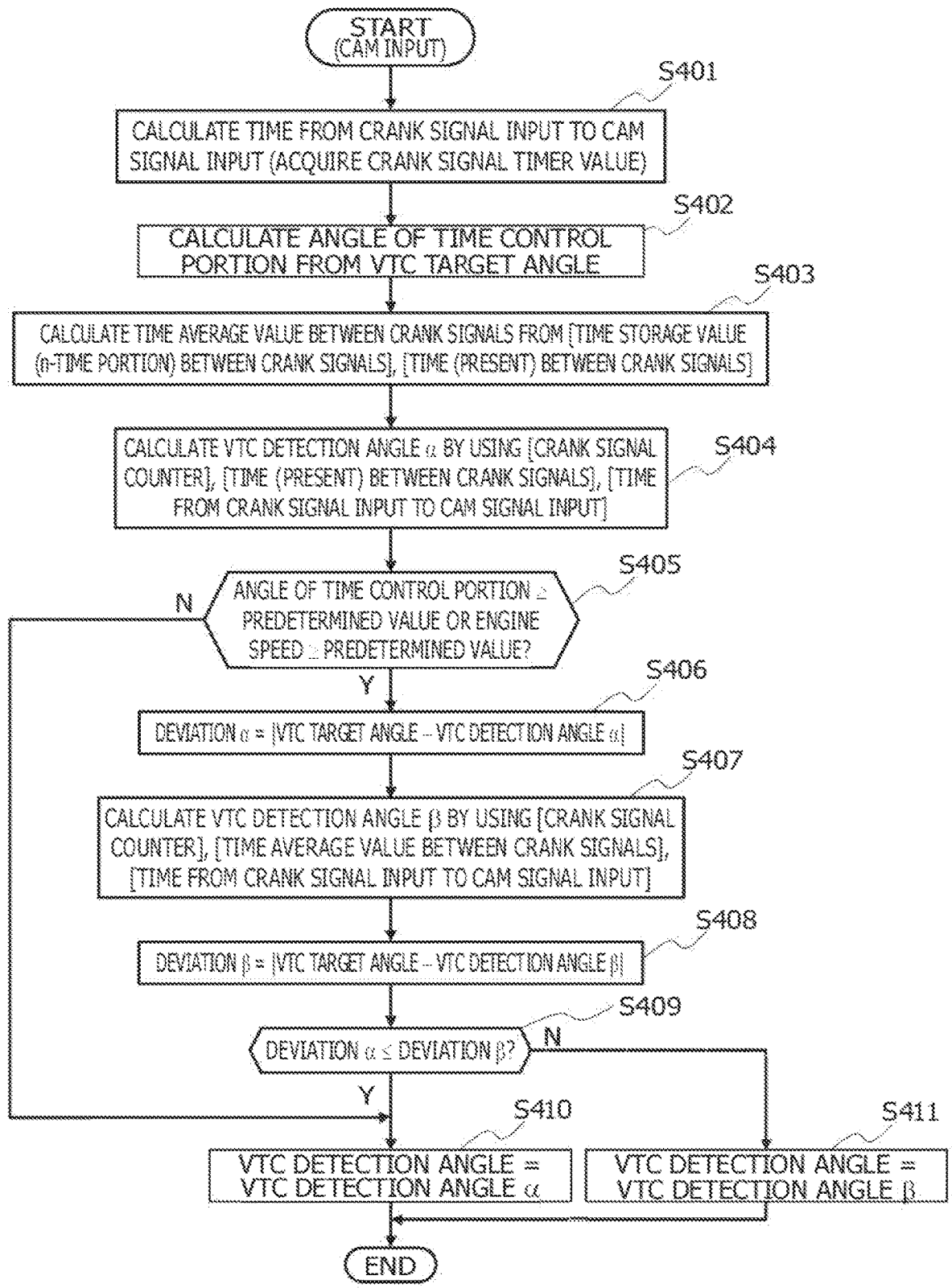
FIG. 18 is a flowchart showing a third embodiment for calculating a rotation phase of a VTC mechanism, when a computation cycle is a cam interrupt cycle.

FIGS. 17 and 18 are flowcharts showing a third embodiment for calculating a rotation phase of a VTC mechanism. FIG. 17 shows a CRANK input, FIG. 18 shows a CAM input, and performing or not performing a change of a VTC detection angle is determined, by the angle of a time control portion and the engine speed condition. Since the CRANK input is the same as in FIG. 11, the same reference numerals are attached to the same portions, and a detailed description thereof will be omitted.

In a CAM input, such as shown in FIG. 18, first, a CRANK timer value is acquired, and the time from a CRANK signal input to a CAM signal input is calculated (step S401). Next, the angle of the time control portion from a VTC target angle is calculated (step S402). Subsequently, a time average value between CRANK signals is calculated from [time storage value (n-time portion) between CRANK signals] and [time (present) between CRANK signals] (step S403). Subsequently, VTC detection angle α is calculated by using [CRANK signal counter], [time (present) between CRANK signals], and [time from CRANK signal input to CAM signal input] (step S404).

Then, whether or not [angle of time control portion≥predetermined value], or [engine speed predetermined value] is established, is determined (step S405). When at least one of these is established, deviation α is obtained, in accordance with the following equation (step S406).

Deviation α=|VTC target angle−VTC detection angle α|

On the other hand, when it is determined that [angle of time control portion≥predetermined value] or [engine speed≤predetermined value] is not established in step S405, the process moves to step S410, and the VTC detection angle is set to the VTC detection angle calculated in step S404.

In step S407, VTC detection angle β is calculated by using [CRANK signal counter], [time average value between CRANK signals], and [time from CRANK signal input to CAM signal input]. Then, deviation β is obtained, in accordance with the following equation (step S408).

Deviation β=|VTC target angle−VTC detection angle β|

Next, whether or not [deviation α≤deviation β] is established (step S409) is determined, and if [deviation α≤deviation β] is established, the process ends by setting to [VTC detection angle=VTC detection angle α] (step S410). If [deviation α≤deviation β] is not established, the process ends by setting to [VTC detection angle=VTC detection angle β] (step S411).

In this way, in the third embodiment, performing and not performing a change of a VTC detection angle is determined, in accordance with whether or not the angle of a time control portion is greater than a predetermined value, and whether or not the engine speed is less than a predetermined value.

Figure 19A:
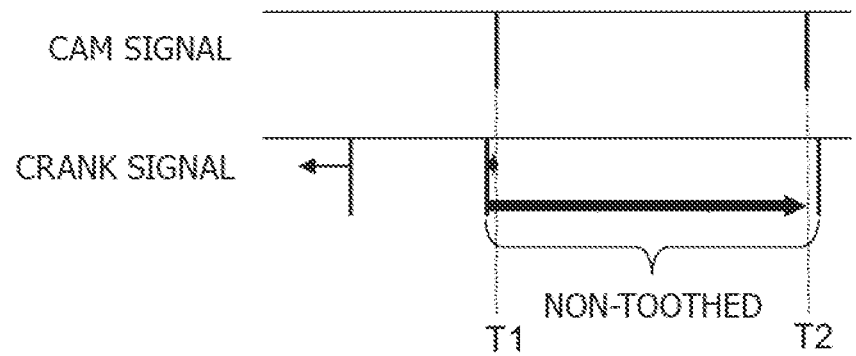
FIG. 19A is a waveform diagram for describing an erroneous computation amount due to a difference in a time control portion.
Figure 19B:
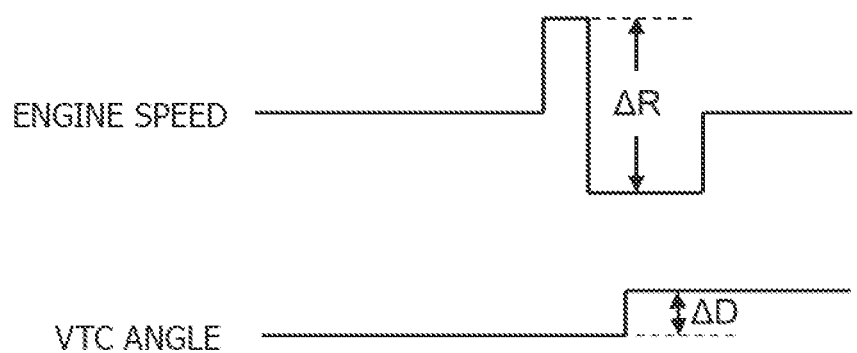
FIG. 19B is a waveform diagram for describing an erroneous computation amount due to a difference in a time control portion.
Figure 19C:
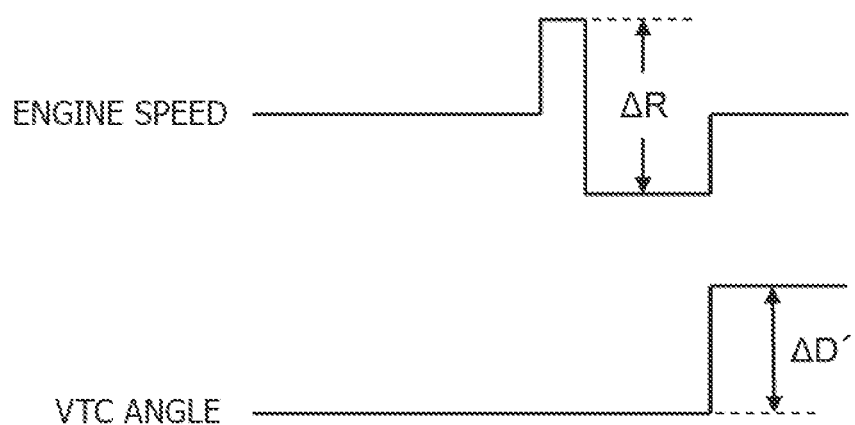
FIG. 19C is a waveform diagram for describing an erroneous computation amount due to a difference in a time control portion.

FIGS. 19A and 19B are waveform diagrams for describing an erroneous computation amount due to a difference in a time control portion. FIG. 19A shows a magnitude relationship of a time control portion when a CAM signal is positioned at non-toothed part of a CRANK signal. FIGS. 19B and 19C each show a simulation result at different cam positions when variation of about ±50 [r/min] is given to the engine speed of about 550 [r/min].

FIG. 19B shows the case of a shortest pulse interval (time) from when a pulse of the CRANK signal is input until a pulse of the CAM signal pulse is input, in other words, the case in which the time control portion is shortest. Moreover, FIG. 19C shows the case of a longest pulse interval (time) from when a pulse of the CRANK signal is input until a pulse of the CAM signal pulse is input, in other words, the case in which the time control portion is longest.

As shown in FIG. 19A, when a pulse of the CAM signal is input at the timing of time T1, in a non-toothed part of the CRANK signal, the time control portion is at a minimum. In this case, as shown in FIG. 19B, when the engine speed varies by about ±ΔR [r/min], a VTC angle is set to an erroneous computation of about ΔD deg. CA.

On the other hand, when a pulse of the CAM signal is input at the timing of time T2, the time control portion is at a maximum. In this case, as shown in FIG. 19C, when the engine speed varies by about ±ΔR [r/min], a VTC angle is set to an erroneous computation of ΔD' deg. CA. For example, VTC angle ΔD' is about 2.8 times ΔD.

In this way, even with a same rotation variation, the erroneous computation amount of an VTC angle differs, in accordance with a difference in the time control portion, and the erroneous computation increases as the time control portion increases. Accordingly, the erroneous computation amount can be reduced by changing the time between immediately prior CRANK signals (change of the pulse interval to be used).

Figure 20:
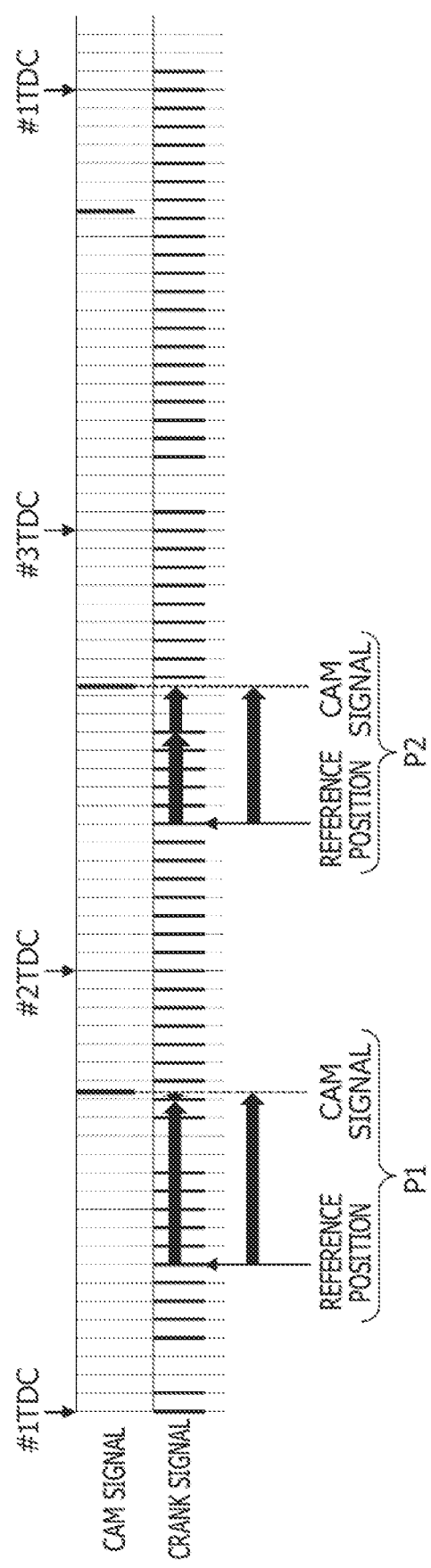
FIG. 20 is a waveform diagram showing a pattern example of a crank angle signal and a cam angle signal for describing a case of performing switching by an angle of a time control portion.

FIG. 20 is a waveform diagram for describing the case in which performing switching by an angle of a time control portion, and shows a pattern example of a crank angle signal and a cam angle signal. Here, it shows a pattern P1 of a reference position, a CAM signal, and a CRANK signal when the angle of the time control portion is small, and a pattern P2 of a reference position, a CAM signal, and a CRANK signal when the angle of the time control portion is large.

It is possible to index the CAM position from the VTC target angle, by using a CRANK signal pattern and a CAM signal pattern. In other words, the angle of the time control portion can be determined from the VTC target angle.

Accordingly, the angle of the time control portion is calculated from the VTC target angle, and when it is small, the calculation method of the VTC detection angle does not change. That is, when the angle of the time control portion is less than a predetermined value, switching may not be performed, and when the angle of the time control portion is greater than a predetermined value, switching may be performed.

The influence of a difference in engine speed on an erroneous computation differs, and deflections occur, even if rotation variations decrease, as the engine rotation decreases. Furthermore, the permitted rotation variation width differs in accordance with the engine speed, and the rotation variation width narrows as the engine speed decreases. The permitted rotation variation width differs in accordance with the magnitude of the time control portion, and the rotation variation width narrows as the time control portion increases.

Therefore, it is better to execute a determination of performing or not performing a change of a calculation method, depending on the engine speed.

Fourth Embodiment

Figure 21:
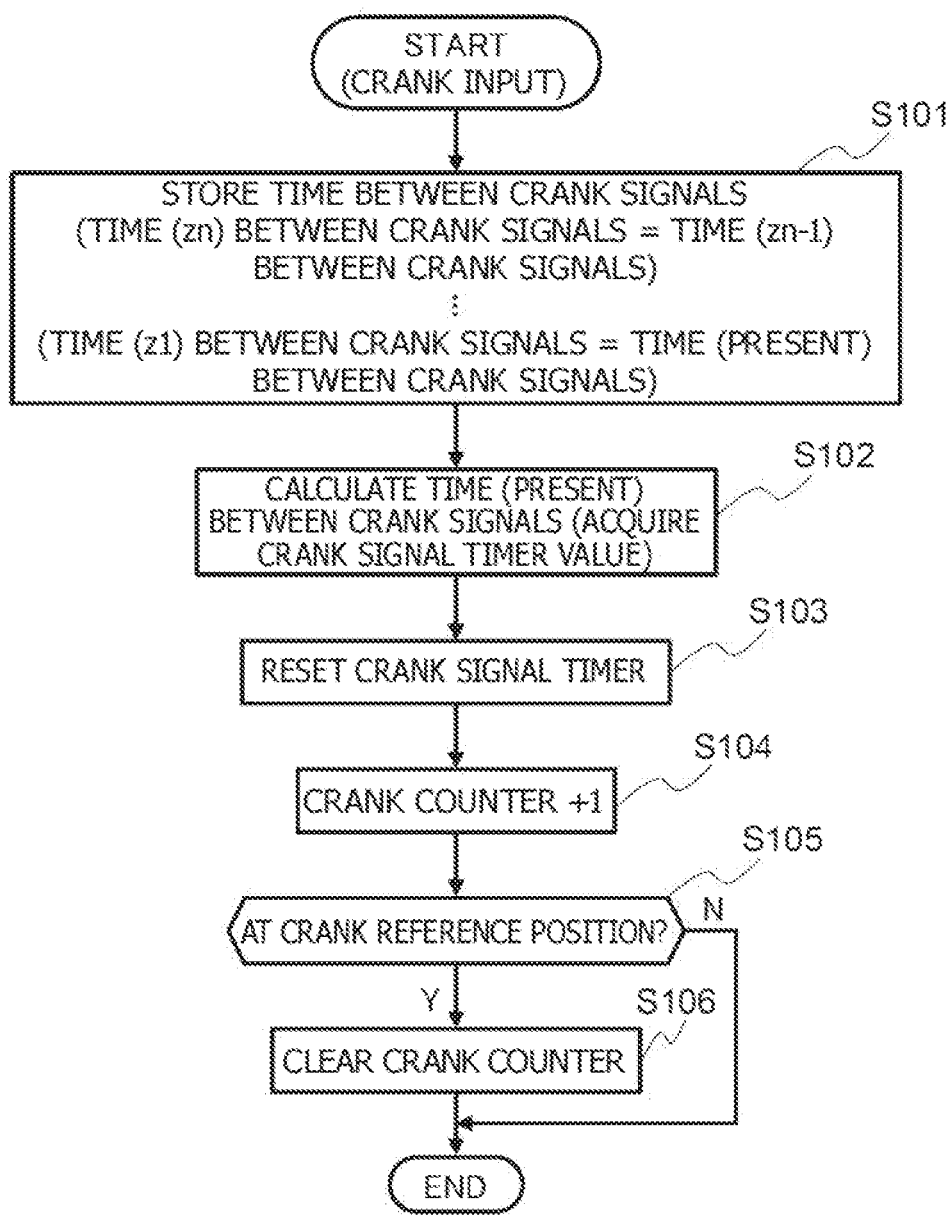
FIG. 21 is a flowchart showing a fourth embodiment for calculating a rotation phase of a VTC mechanism, when a computation cycle is a crank interrupt cycle.
Figure 22:
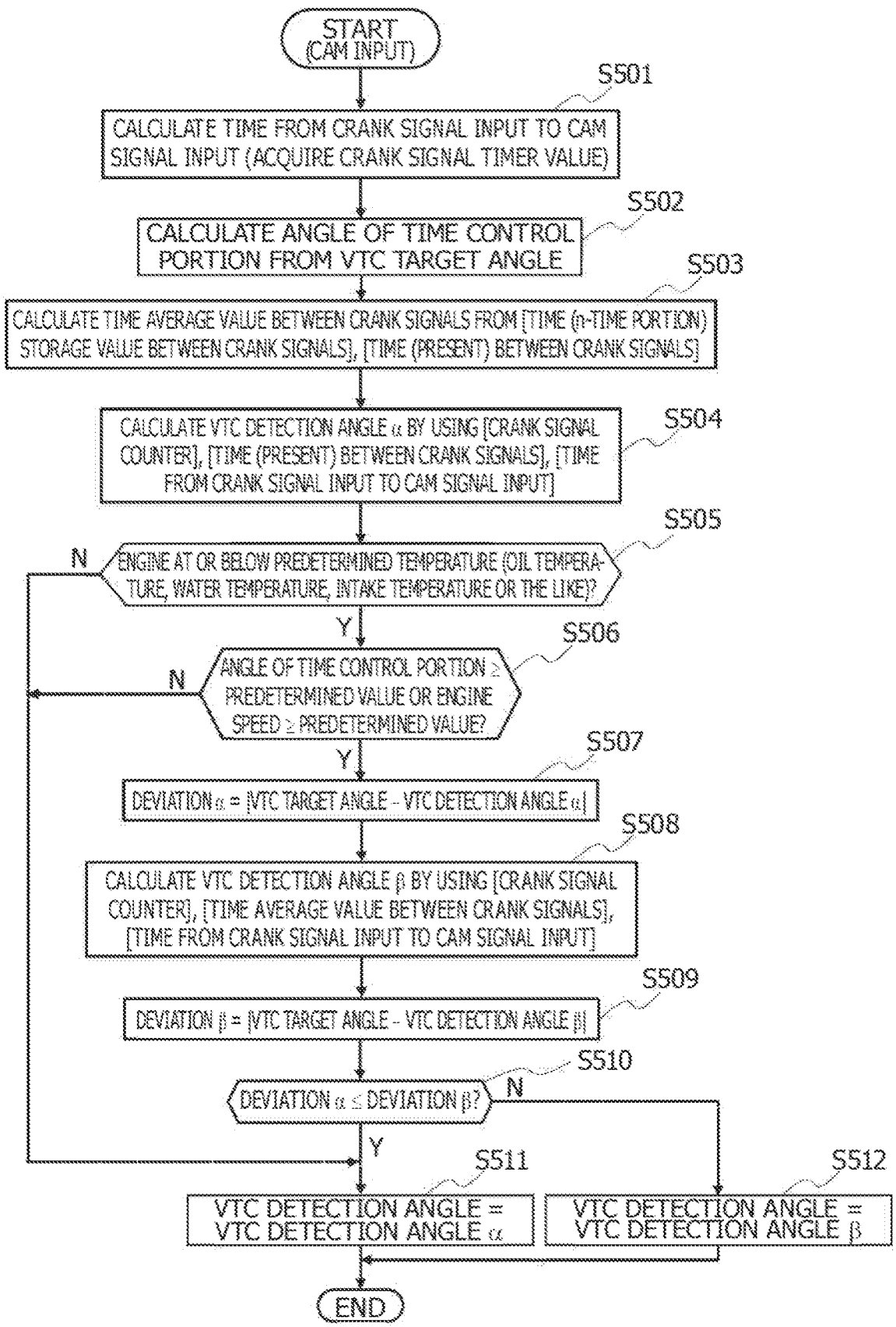
FIG. 22 is a flowchart showing a fourth embodiment for calculating a rotation phase of a VTC mechanism, when a computation cycle is a cam interrupt cycle.

FIGS. 21 and 22 are flowcharts showing a fourth embodiment for calculating a rotation phase of a VTC mechanism. FIG. 21 shows a CRANK input, FIG. 22 shows a CAM input, and performing and not performing a change of a VTC detection angle is determined by temperature information. Since the CRANK input is the same as in FIG. 11, the same reference numerals are attached to the same portions, and detailed description thereof will be omitted.

In a CAM input, such as shown in FIG. 22, first, a CRANK timer value is acquired, and the time from a CRANK signal input to a CAM signal input is calculated (step S501). Next, the angle of the time control portion from the VTC target angle is calculated (step S502). Subsequently, a time average value between CRANK signals is calculated from [time storage value (n-time portion) between CRANK signals] and [time (present) between CRANK signals] (step S503). Subsequently, VTC detection angle α is calculated by using [CRANK signal counter], [time (present) between CRANK signals], and [time from CRANK signal input to CAM signal input] (step S504).

Next, whether the engine is at or below a predetermined temperature is determined by using an oil temperature, water temperature, intake temperature or the like (step S505). This determination is performed because friction increases as temperature decreases, and rotation variations of the engine increase. If the engine is at or less than a predetermined temperature, it is determined whether or not [angle of time control portion≥predetermined value] or [engine speed predetermined value] is established (step S506). When at least one of these is established in step S506, deviation α is obtained, in accordance with the following equation (step S507).

Deviation α=|VTC target angle−VTC detection angle α|

On the other hand, when it is determined that it is not at or less than a predetermined temperature in step S505, and when it is determined that [angle of time control portion−≥predetermined value] or [engine speed predetermined value] is not established in step S506, the process moves to step S511, and the VTC detection angle is set to VTC detection angle α calculated in step S504.

In step S508, VTC detection angle β is calculated by using [CRANK signal counter], [time average value between CRANK signals], and [time from CRANK signal input to CAM signal input]. Then, deviation β is obtained, in accordance with the following equation (step S509).

Deviation β=|VTC target angle−VTC detection angle β|

Subsequently, whether or not [deviation α≤deviation β] is established (step S510) is determined. If [deviation α≤deviation β] is established, the process ends by setting to [VTC detection angle=VTC detection angle α] (step S511), and if [deviation α≤deviation β] is not established, the process ends by setting to [VTC detection angle=VTC detection angle β] (step S512).

In this way, in the fourth embodiment, performing and not performing a change of a VTC detection angle is determined, by using temperature information such as an oil temperature, water temperature, intake temperature or the like, and determining whether the engine is at or below a predetermined temperature. In addition, similar to the third embodiment, performing and not performing a change of a VTC detection angle is determined, in accordance with whether or not the angle of the time control portion is greater than a predetermined value, or whether or not the engine speed is less than a predetermined value.

Fifth Embodiment

Figure 23:
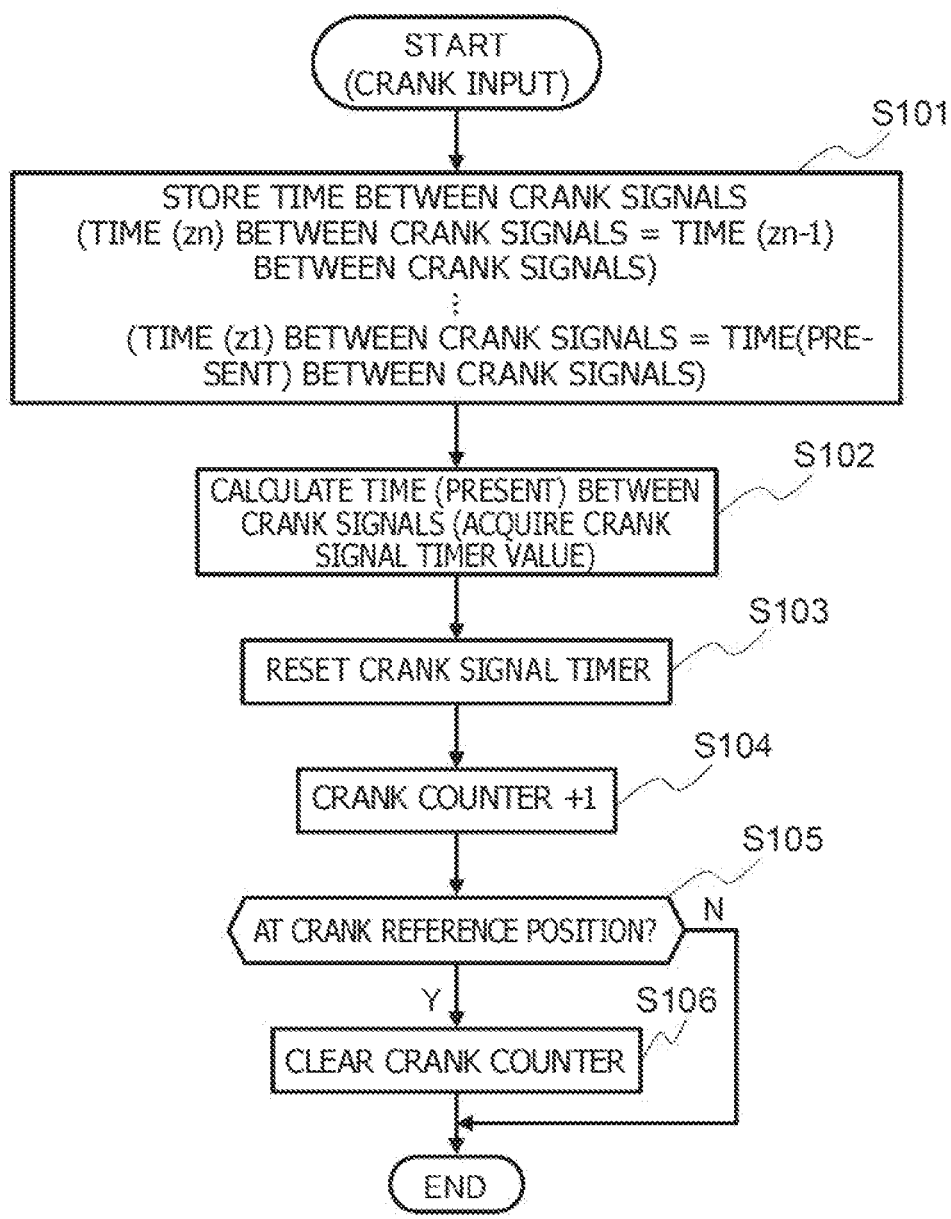
FIG. 23 is a flowchart showing a fifth embodiment for calculating a rotation phase of a VTC mechanism, when a computation cycle is a crank interrupt cycle.
Figure 24:
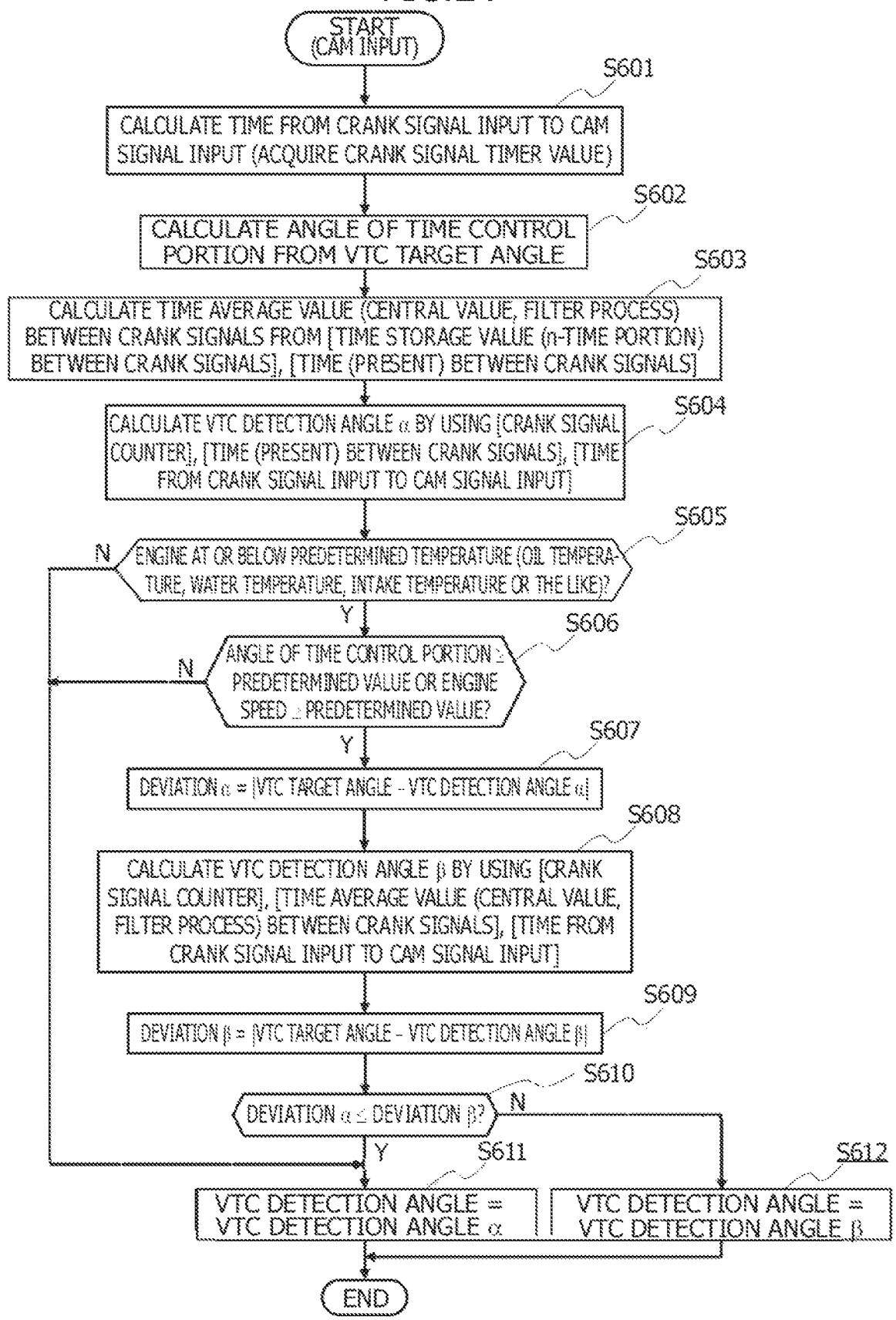
FIG. 24 is a flowchart showing a fifth embodiment for calculating a rotation phase of a VTC mechanism, when a computation cycle is a cam interrupt cycle.

FIGS. 23 and 24 are flowcharts showing a fifth embodiment for calculating a rotation phase of a VTC mechanism. FIG. 23 shows a CRANK input, FIG. 24 shows a CAM input, and a calculation of the time between CRANK signals includes a central value and a filter process. Since the CRANK input is the same as in FIG. 11, the same reference numerals are attached to the same portions, and a detailed description thereof will be omitted.

In a CAM input, such as shown in FIG. 24, first, a CRANK timer value is acquired, and the time from a CRANK signal input to a CAM signal input is calculated (step S601). Next, the angle of the time control portion from a VTC target angle is calculated (step S602). Subsequently, a time average value between CRANK signals is calculated from [time storage value (n-time portion) between CRANK signals] and [time (present) between CRANK signals] (step S603). Here, a central value, or a value for which a filter process is performed with respect to an average value or a central value, is used as the time average value. Subsequently, VTC detection angle α is calculated by using [CRANK signal counter], [time (present) between CRANK signals], and [time from CRANK signal input to CAM signal input] (step S604).

Next, whether the engine is at or below a predetermined temperature is determined by using an oil temperature, water temperature, intake temperature or the like (step S605). If the engine is at or lower than a predetermined temperature, whether or not [angle of time control portion≥predetermined value] or [engine speed≤predetermined value] is established is determined (step S606). At the time when at least one of these is established, deviation α is obtained, in accordance with the following equation (step S607).

Deviation α=|VTC target angle−VTC detection angle α|

On the other hand, when it is determined that the engine is not at or lower than a predetermined temperature in step S605, and when it is determined that [angle of time control portion≥predetermined value] or [engine speed predetermined value] is not established in step S606, the process moves to step S611, and the VTC detection angle is set to VTC detection angle α calculated in step S604.

Next, VTC detection angle β is calculated by using [CRANK signal counter], [time average value between CRANK signals], and [time from CRANK signal input to CAM signal input] (step S608). Here, a central value, or a value for which a filter process is performed with respect to an average value or a central value, is used as the time average value. Then, deviation β is obtained, in accordance with the following equation (step S609).

Deviation β=|VTC target angle−VTC detection angle β|

Subsequently, whether or not [deviation α≤deviation β] is established (step S610) is determined. If [deviation α≤deviation β] is established, the process ends by setting to [VTC detection angle=VTC detection angle α] (step S611), and if [deviation α≤deviation β] is not established, the process ends by setting to [VTC detection angle=VTC detection angle β] (step S612).

In this way, in the fifth embodiment, a central value, or a value for which a filter process is performed with respect to an average value or a central value, is used as the time average value in the fourth embodiment. In this case, performing and not performing a change of a VTC detection angle is determined, by using temperature information such as an oil temperature, water temperature, intake temperature or the like, and determining whether the engine is at or below a predetermined temperature. In addition, similar to the third embodiment, performing and not performing a change of a VTC detection angle is determined, in accordance with whether or not the angle of the time control portion is greater than a predetermined value, or whether or not the engine speed is less than a predetermined value.

Sixth Embodiment

Figure 25:
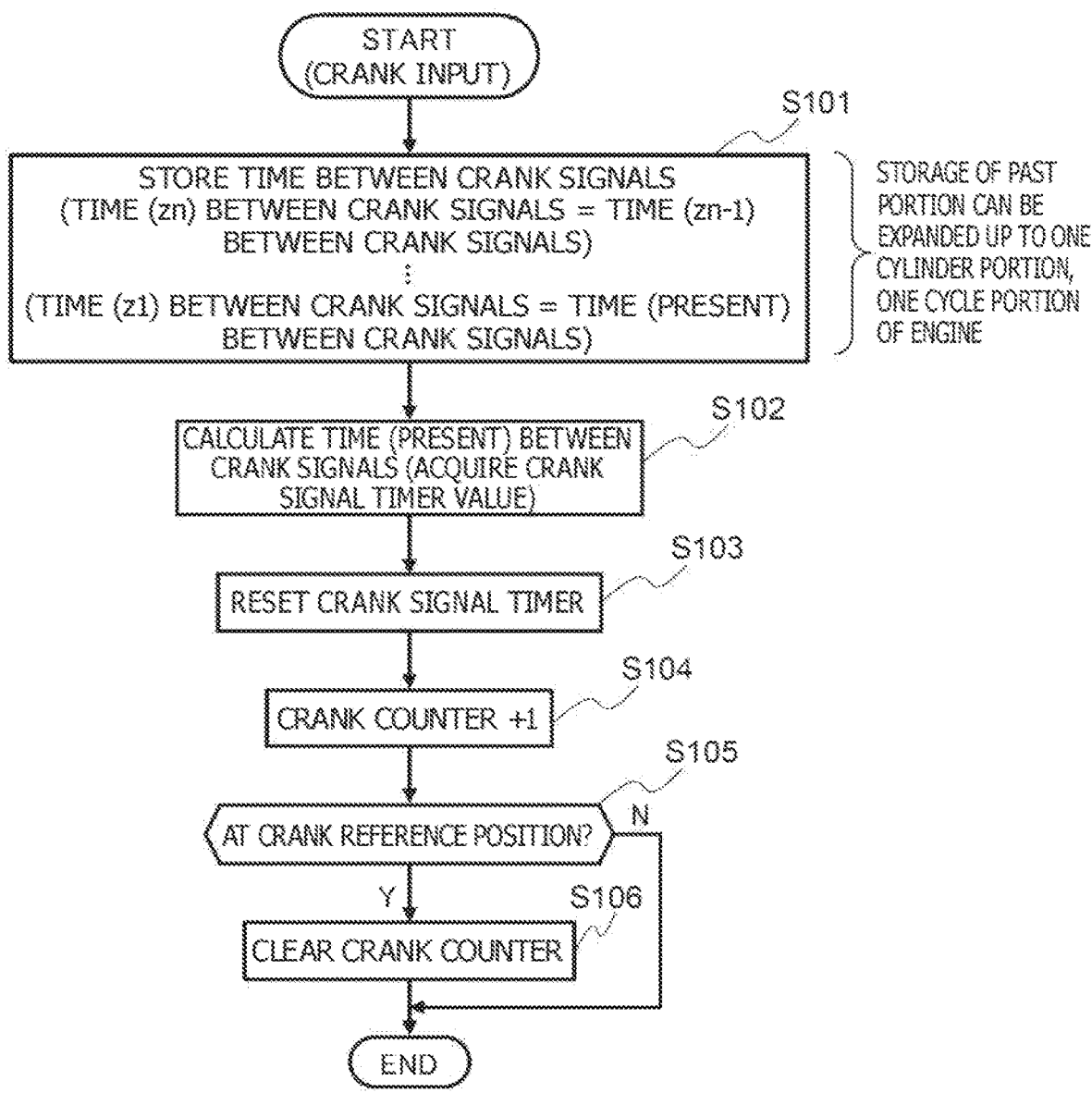
FIG. 25 is a flowchart showing a sixth embodiment for calculating a rotation phase of a VTC mechanism, when a computation cycle is a crank interrupt cycle.
Figure 26:
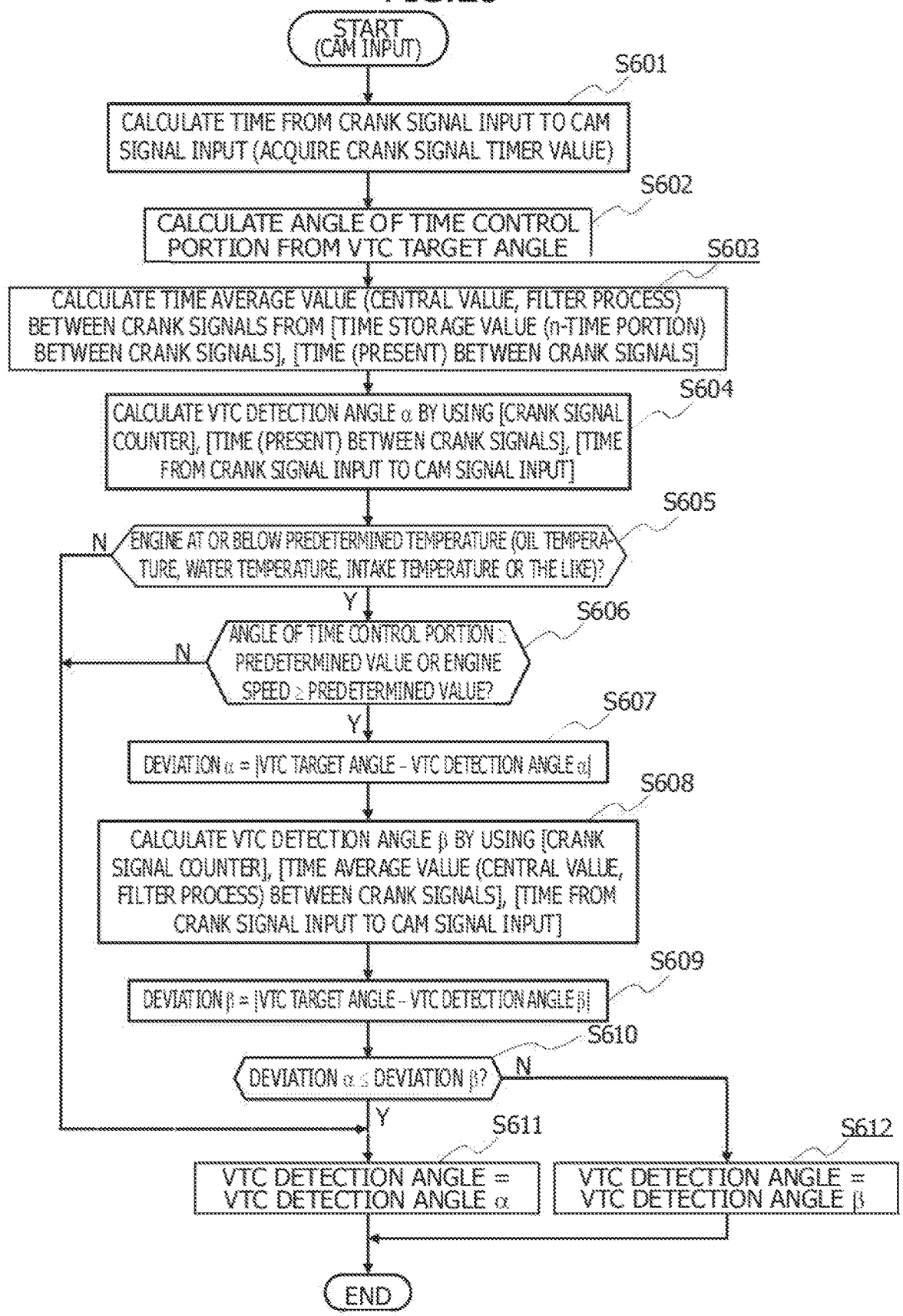
FIG. 26 is a flowchart showing a sixth embodiment for calculating a rotation phase of a VTC mechanism, when a computation cycle is a cam interrupt cycle.

FIGS. 25 and 26 are flowcharts showing a sixth embodiment for calculating a rotation phase of a VTC mechanism. FIG. 25 shows a CRANK input, FIG. 26 shows a CAM input, and a usage range of past data is expanded up to one cycle portion of the engine. While the CRANK input is basically the same as in FIG. 11, in step S101, storage of past data can be expanded up to one cylinder portion, or one cycle portion of the engine.

On the other hand, the CAM input, such as shown in FIG. 26, is the same as in FIG. 24, the same reference numerals are attached to the same portions, and detailed description thereof will be omitted.

FIGS. 27A and 27B are waveform diagrams for describing a correspondence to rotation variations of an engine. It is good to enable a selection of a wide usage range of past data, so as to enable correspondence to multiple engine rotation variation patterns. As shown in FIG. 27A, when the engine speed varies between cylinders, an average value for one cylinder portion is used.

Furthermore, as shown in FIG. 27B, when the engine speed varies in one cycle, an average value of one cycle portion is used.

In such a sixth embodiment, deflections of an operation amount can be further suppressed, by expanding the usage range of past data up to an average value of one cylinder portion, or to one cycle portion of the engine.

Seventh Embodiment

In the descriptions, while various countermeasures have been taken in order to suppress deflections of an operation amount of a VTC mechanism, there are cases in which deflections remain in a rotation phase, even if countermeasures are performed. A countermeasure of such a case will be described below.

Figure 28A:
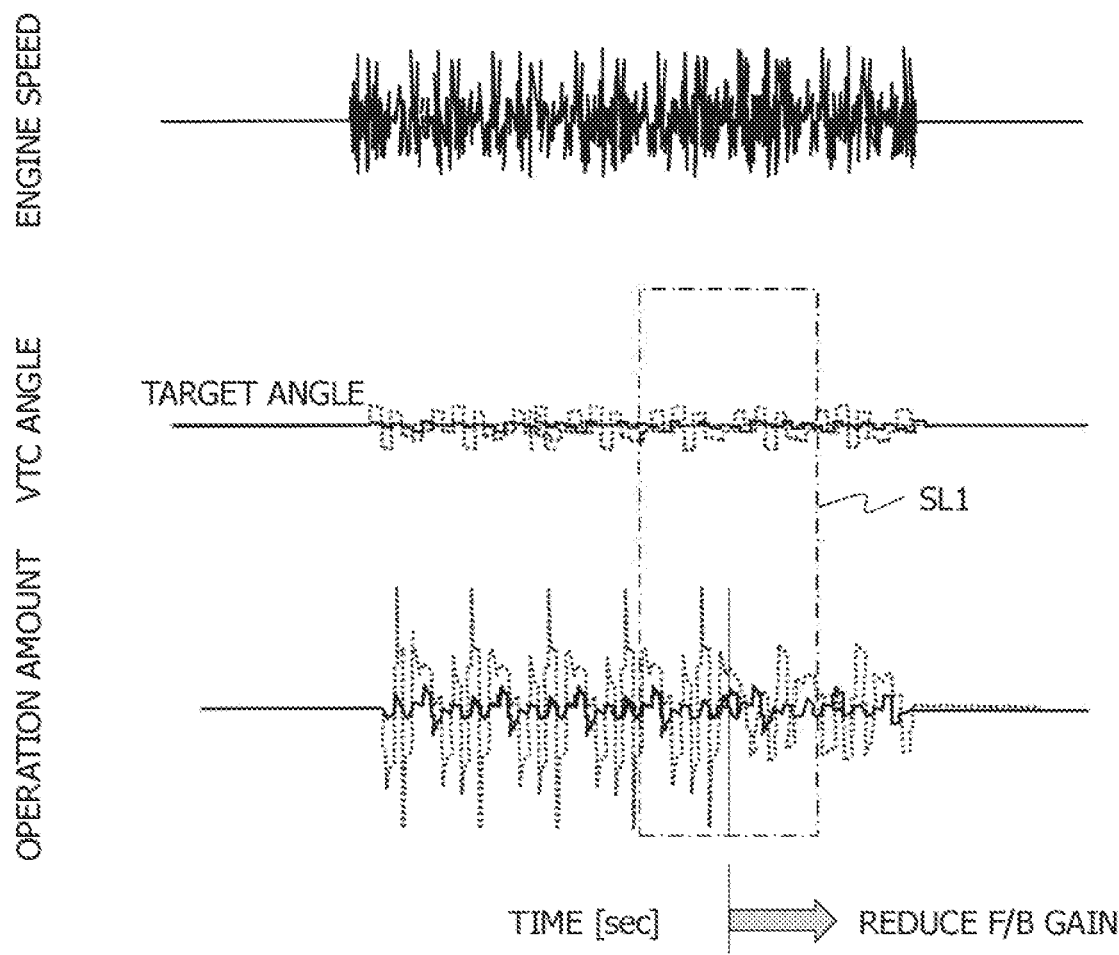
FIG. 28A is a waveform diagram for describing a seventh embodiment that suppresses deflections of an operation amount by a reduction of a F/B gain.
Figure 28B:
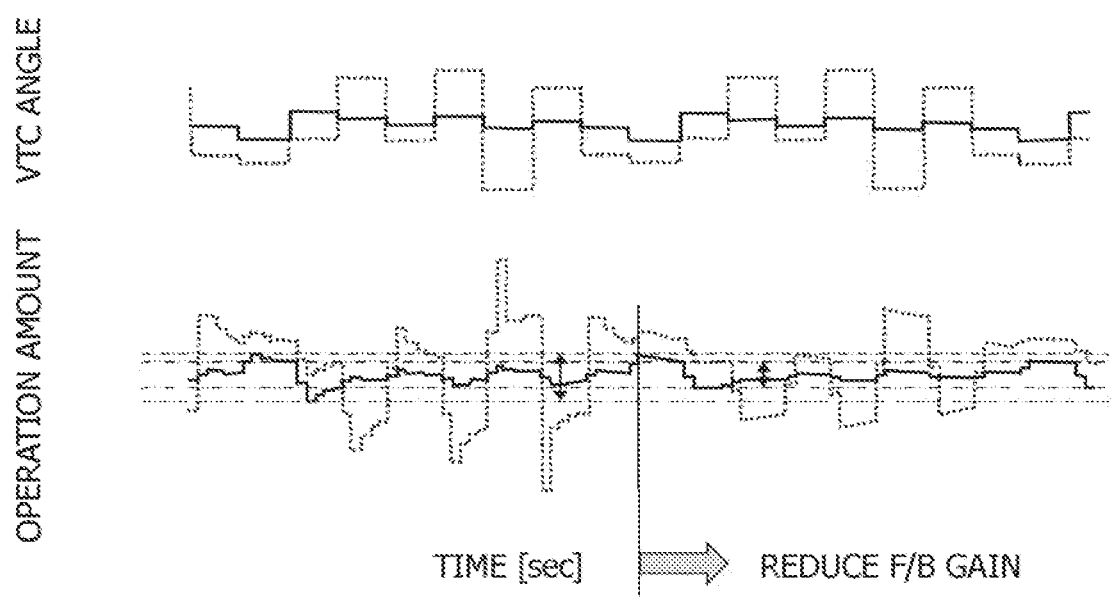
FIG. 28B is a waveform diagram for describing a seventh embodiment that suppresses deflections of an operation amount by a reduction of a F/B gain.

FIGS. 28A and 28B are waveform diagrams for describing a method that suppresses deflections of an operation amount, by a reduction of a feedback (F/B) gain. FIG. 28A shows an engine speed, VTC angle, and operation amount, and FIG. 28B is an enlarged view of the region SL1 surrounded by alternate long and short dash lines in the VTC angle of FIG. 28A.

In this seventh embodiment, when deflections remain in a rotation phase of a VTC mechanism, the deflection width of an operation amount can be suppressed by reducing a F/B gain in PID control. At this time, any one of a P-gain, I-gain, and D-gain, or all of them may be reduced.

Eighth Embodiment

Figure 29:
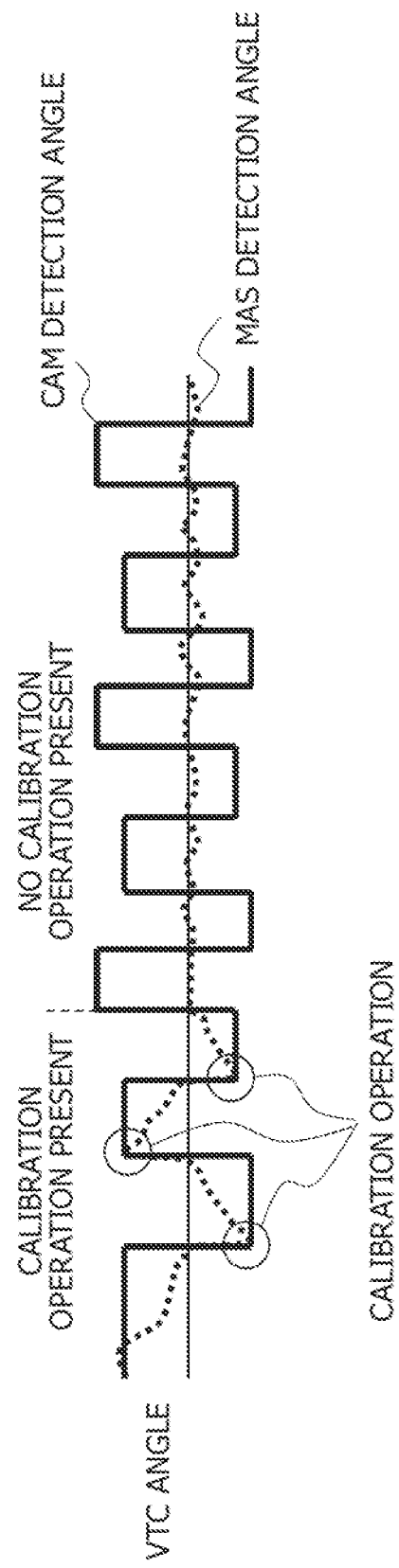
FIG. 29 is a waveform diagram for describing an eighth embodiment that suppresses deflections of an operation amount by stopping calibration of a VTC angle.

FIG. 29 is a waveform diagram for describing a method that suppresses deflections of an operation amount, by stopping calibration of a VTC angle. Deflections in an operation amount occur by sudden changes in a VTC detection angle due to a calibration operation. Accordingly, operation amount deflections can be suppressed, by stopping calibration of an interpolation angle. Specifically, it is controlled by only a detection angle by motor shaft rotation angle signal MAS, that is, the calibration operation of motor shaft rotation angle signal MAS is stopped. Also, calibration is performed when deviations with respect to a target angle become large. As a matter of course, there is no limit to the MAS detection angle, and it can be generally applied to an interpolation angle (angle interpolating between CAM detection angles).

In such an eighth embodiment, in the case in which deflections in an operation amount of the VTC mechanism occur, calibration of an interpolation angle is stopped, and the deflection width of an operation amount can be further suppressed, by performing calibration when deviations with respect to a target angle become large.

Figure 30A:
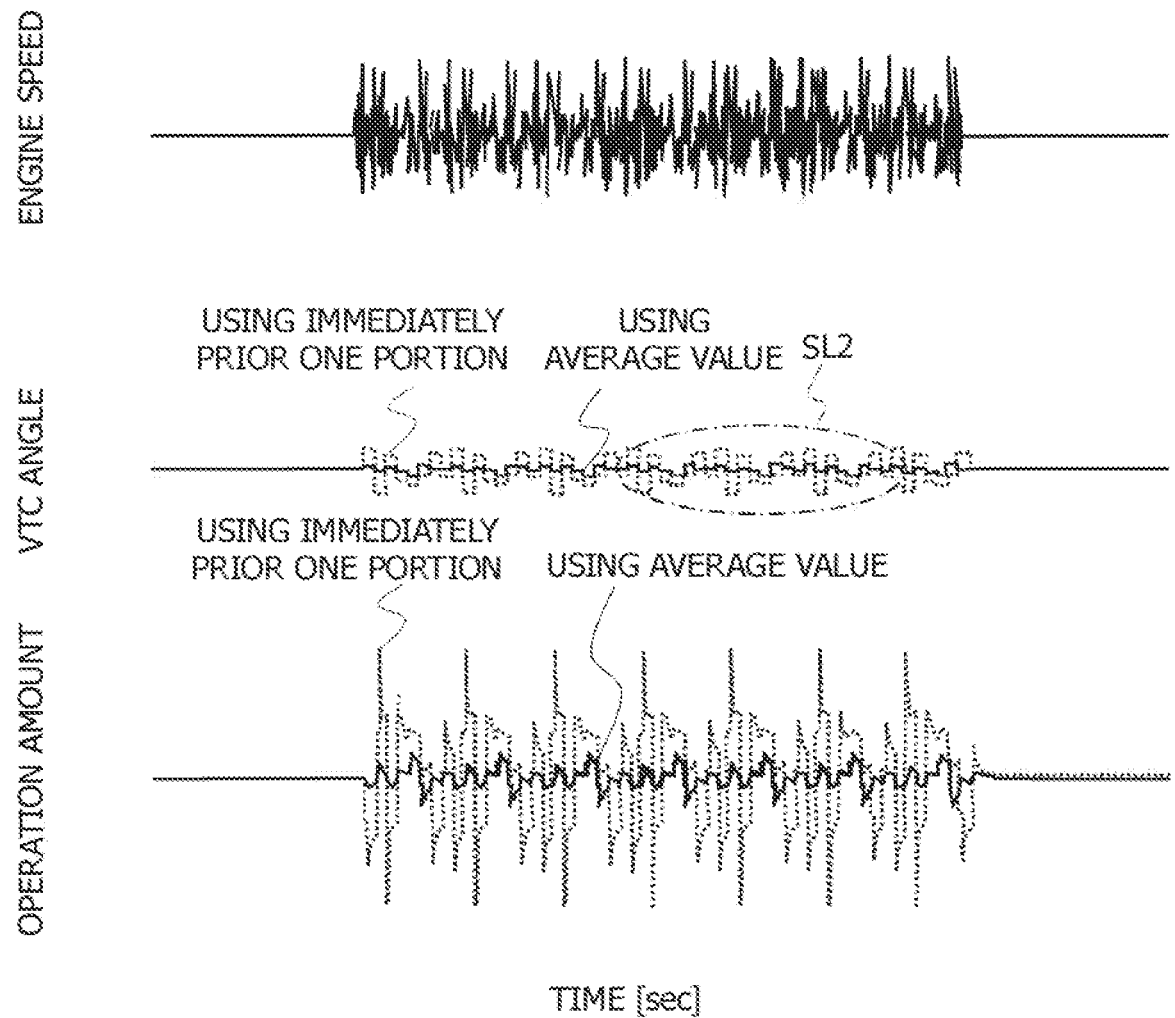
FIG. 30A is a waveform diagram showing a simulation result at a time of providing variations to a CRANK signal.
Figure 30B:
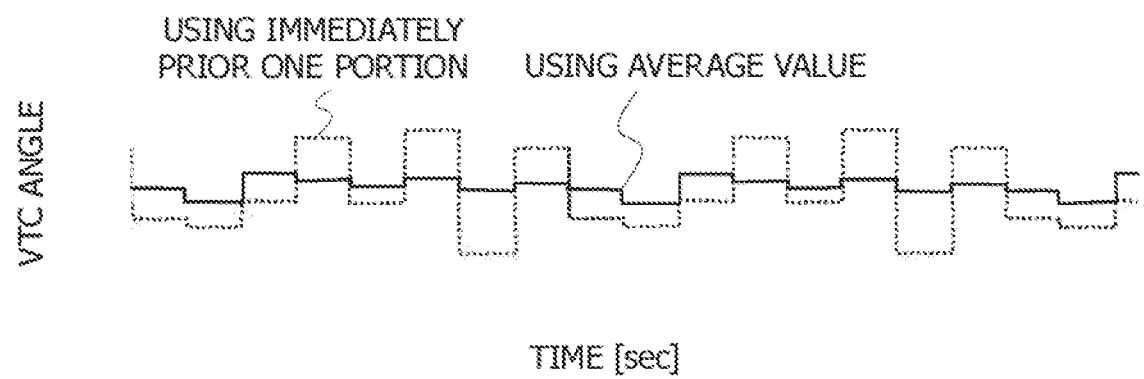
FIG. 30B is a waveform diagram showing a simulation result at a time of providing variations to a CRANK signal.

FIGS. 30A and 30B each show a simulation result at the time when providing variations to a CRANK signal. FIG. 30A shows an engine speed, VTC angle, and operation amount, and FIG. 30B is an enlarged view of the region SL2 surrounded by alternate long and short dash lines in the VTC angle of FIG. 30A.

As shown in FIG. 30B, when one immediately prior portion is used, while deflections to the extent of ±3 [deg. CA] occur with respect to a target, they can be suppressed to within ±1 [deg CA] when an average value is used.

By the present simulation, it can be confirmed that VTC detection angle deflections due to continuous erroneous computation can be suppressed, in a VTC constant angle holding state. As a result of this, deflections of an operation amount can be suppressed, and an increase in a motor drive current can be suppressed. Furthermore, it is possible to prevent a reduction in the durability of an electric VTC controller or actuator, and to reduce power consumption.

While the influence due to rotation variations at the time of starting is momentary, in a case in which they occur every time the start frequency is repeated, the effect of accumulating an operation amount reduction effect will be large. Furthermore, it is effective not only at the time of starting, but also when rotation variations during constant rotation holding are large.

As described, according to the present invention, the influence of rotation variations of an engine on a VTC detection angle computation can be reduced, by using information of a pulse interval of a past crank sensor signal, and changing a calculation method of a rotation phase of a variable valve timing mechanism.

The configuration, control method and the like are merely shown schematically in a manner such that the present invention can be understood and be executed. Therefore, the present invention is not limited to the described embodiments and modifications, and it can be modified to various forms without departing from the scope of the technical concept claimed in the claims.

REFERENCE SYMBOL LIST

12 Electric Motor
100 Engine
114 VTC Mechanism
201 Control Device
201a Electric VTC Controller
201b Engine Control Module (ECM)
201c CAN
203 Crank Angle Sensor
204 Cam Angle Sensor
220 Motor Rotation Angle Sensor
CRANK Crank Sensor Signal
CAM Cam Sensor Signal
MAS Motor Shaft Rotation Angle Signal

The invention claimed is:

1. A control device for a variable valve timing mechanism using a crank sensor signal and a cam sensor signal of an engine to calculate a rotation phase of the variable valve timing mechanism and to control the variable valve timing mechanism, the control device comprising:
a microcomputer that uses a pulse interval of the crank sensor signal for a calculation of the rotation phase of the variable valve timing mechanism, and changes a calculation method of the rotation phase of the variable valve timing mechanism depending on the pulse interval of the crank sensor signal determined before the cam sensor signal is input, wherein
the microcomputer is configured to perform feedback control of the rotation phase, which computes and outputs an operation amount of electric motor so that an actual relative rotation phase angle approaches the target phase angle, and is configured to perform feedback control in which the microcomputer is further configured to compute an operation amount of electric motor via proportional integral control, based on a deviation between the target phase angle and the actual relative rotation phase angle.

2. The control device for a variable valve timing mechanism according to claim 1, wherein a calculation of the rotation phase of the variable valve timing mechanism by the microcomputer includes a computation of an angle control portion that is a counter value of the crank sensor signal, and a computation of a time control portion that is an input time of the crank sensor signal.

3. The control device for a variable valve timing mechanism according to claim 1, wherein a change of the calculation method of the rotation phase of the variable valve timing mechanism by the microcomputer is a change of the pulse interval to be used for computation, or a selection from multiple calculated angle values.

4. The control device for a variable valve timing mechanism according to claim 1, wherein the microcomputer executes a determination of performing or not performing a change of the calculation method depending on a target angle or an engine speed of the variable valve timing mechanism.

5. The control device for a variable valve timing mechanism according to claim 1, wherein the microcomputer uses temperature information including at least one of oil temperature, water temperature, and intake temperature as a condition for performing or not performing a switch of the calculation method.

6. The control device for a variable valve timing mechanism according to claim 2, wherein a computation of the time control portion in a calculation of the rotation phase of the variable valve timing mechanism by the microcomputer includes at least one of an average value computation, a central value selection, and a filter process.

7. The control device for a variable valve timing mechanism according to claim 6, wherein a usage range of past data in the average value computation, central value selection, and filter process includes multiple selections and multiple combined uses.

8. The control device for a variable valve timing mechanism according to claim 1, wherein in the case in which deflections remain in the rotation phase of the variable valve timing mechanism calculated by the microcomputer, an operation amount is reduced by lowering a feedback gain.

9. The control device for a variable valve timing mechanism according to claim 1, wherein in the case in which deflections remain in the rotation phase of the variable valve timing mechanism calculated by the microcomputer, and in the case of during angle holding, an interpolation angle is used to perform feedback control.

10. A control method for a variable valve timing mechanism using a crank sensor signal and a cam sensor signal of an engine to calculate a rotation phase of the variable valve timing mechanism and to control the variable valve timing mechanism, the control method comprising the steps of:
calculating the rotation phase of the variable valve timing mechanism by using a pulse interval of the crank sensor signal;
changing a calculation method of the rotation phase of the variable valve timing mechanism depending on the pulse interval of the crank sensor signal determined before the cam sensor signal is input;
performing feedback control of the rotation phase, which computes and outputs an operation amount of electric motor so that an actual relative rotation phase angle approaches the target phase angle; and
performing feedback control in which the microcomputer is further configured to compute an operation amount of electric motor via proportional integral control, based on a deviation between the target phase angle and the actual relative rotation phase angle.

* * * * *